United States Patent
Ragner

(10) Patent No.: US 6,523,781 B2
(45) Date of Patent: Feb. 25, 2003

(54) AXIAL-MODE LINEAR WIND-TURBINE

(76) Inventor: Gary Dean Ragner, 711 SW. 75th St. #103, Gainesville, FL (US) 32607

( * ) Notice: Subject to any disclaimer, the term of this patent is extended or adjusted under 35 U.S.C. 154(b) by 0 days.

(21) Appl. No.: 09/941,337

(22) Filed: Aug. 29, 2001

(65) Prior Publication Data

US 2002/0040948 A1 Apr. 11, 2002

Related U.S. Application Data

(60) Provisional application No. 60/229,082, filed on Aug. 30, 2000.

(51) Int. Cl.[7] .............................................. B64C 31/06
(52) U.S. Cl. ...................... 244/153 R; 244/30; 244/33
(58) Field of Search .......................... 244/153 R, 1 R, 244/33, 154, 30, 55, 8, 58, 153–155; 290/44, 45

(56) References Cited

U.S. PATENT DOCUMENTS

| | | | |
|---|---|---|---|
| 3,227,398 A | * | 1/1966 | Struble, Jr. ................. 114/243 |
| 3,924,827 A | * | 12/1975 | Lois ......................... 244/153 R |
| 3,987,987 A | * | 10/1976 | Payne et al. ............. 244/153 R |
| 4,026,504 A | | 5/1977 | Christoffel |
| 4,076,190 A | * | 2/1978 | Lois ......................... 244/153 R |
| 4,084,102 A | * | 4/1978 | Fry et al. ................. 244/153 R |
| 4,124,182 A | * | 11/1978 | Loeb ........................ 244/153 R |
| 4,165,468 A | * | 8/1979 | Fry et al. ....................... 290/55 |
| 4,166,596 A | * | 9/1979 | Mouton et al. ............... 244/30 |
| 4,251,040 A | * | 2/1981 | Loyd .......................... 244/1 R |
| 4,285,481 A | * | 8/1981 | Biscomb ................. 244/153 R |
| 4,335,093 A | * | 6/1982 | Salomon ................ 114/102.29 |
| 4,350,896 A | * | 9/1982 | Benoit .......................... 244/33 |
| 4,350,897 A | * | 9/1982 | Benoit .......................... 244/33 |
| 4,350,898 A | * | 9/1982 | Benoit .......................... 244/33 |
| 4,486,669 A | * | 12/1984 | Pugh .......................... 244/154 |
| 4,491,739 A | * | 1/1985 | Watson ........................ 290/44 |
| 4,494,009 A | * | 1/1985 | Yukl ............................ 290/43 |
| 4,659,940 A | * | 4/1987 | Shepard ....................... 290/44 |
| 5,056,447 A | * | 10/1991 | Labrador ................. 114/39.26 |
| 5,120,006 A | | 6/1992 | Hadzicki |
| 5,533,694 A | * | 7/1996 | Carpenter ............... 244/153 R |
| 5,931,416 A | * | 8/1999 | Carpenter ............... 244/155 A |
| 5,982,046 A | * | 11/1999 | Minh .......................... 290/44 |
| 6,072,245 A | * | 6/2000 | Ockels ........................ 290/44 |
| 6,254,034 B1 | * | 7/2001 | Carpenter ............... 244/153 R |

* cited by examiner

Primary Examiner—Charles T. Jordan
Assistant Examiner—Stephen A. Holzen

(57) ABSTRACT

A wind harnessing system using a plurality of self supporting airfoil kites 50 for production of useful power. The system comprising multiple airfoil kites 50 in tandem attached to a pivotal control housing 32 by control lines 58L and 58R and support lines 60L and 60R. Control lines 58L and 58R can change length with respect to the length of support lines 60L and 60R to control the airfoil kites' 50 angle-of-attack, pitch angle, direction of flight, and flight speed. The length of control lines 58L and 58R are controlled from ground station 30 by a movable pulley system in control housing 32 to adjust the airfoils' direction to follow a specific flight path 140. Control lines 58R and 58L and support lines 60R and 60L are also wound on a power shaft and pulley system in control housing 32. As the airfoil kites are propelled by the wind at very-high speed, the airfoils generate a powerful AXIAL force. The control lines 58L and 58R and support lines 60L and 60R are then reeled-out under this AXIAL tension causing the power shaft and pulley system in control housing 32 to turn a generator to generate electricity. After airfoil kites 50 have finished their reel-out power stroke 140a, the airfoil's pitch angle is made negative so they can be reeled-in by their control and support lines using a minimum of force along path 140b. Once the airfoils have been rewound to the proper distance, the airfoils are again angled for high-speed operation to generate powerful AXIAL force and reeled-out along 140c to provide another power stroke. The airfoil kites are then reeled-in again along path 140d and the entire process repeats starting with power stroke 140a. Since the force to rewind the airfoils is much less than the force generated during reel-out, there is net power generated.

19 Claims, 12 Drawing Sheets

Figure 1:
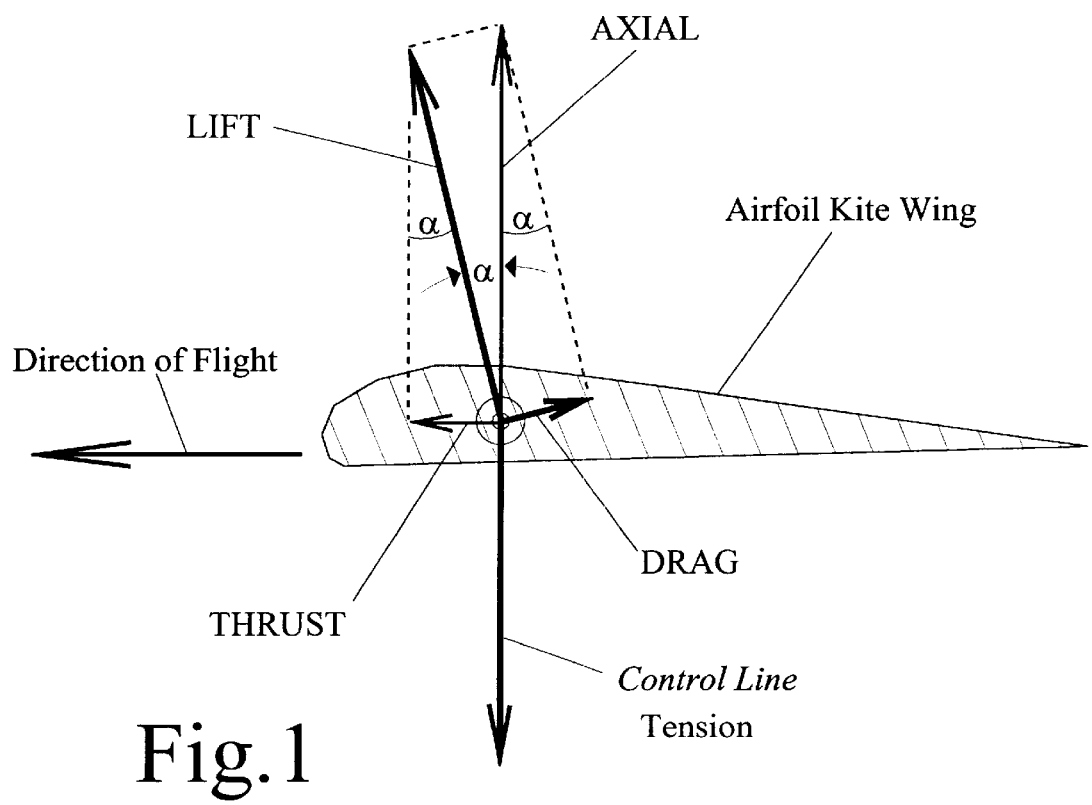

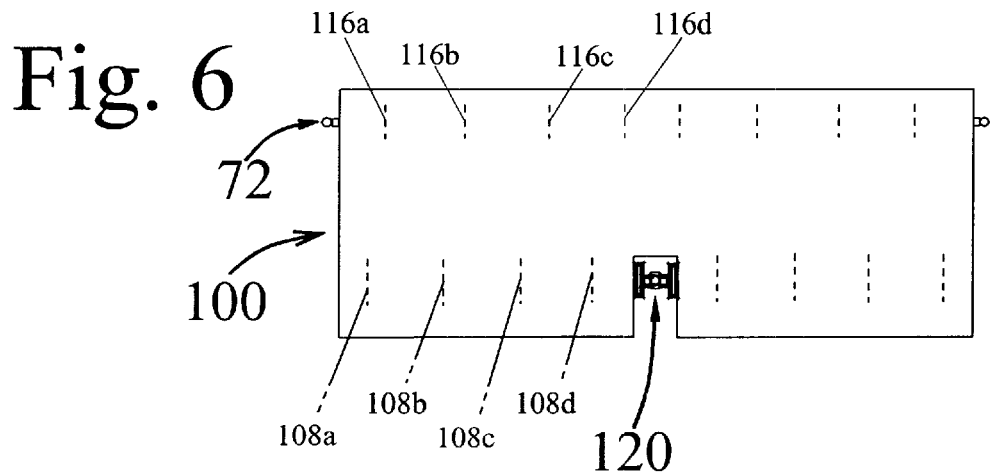
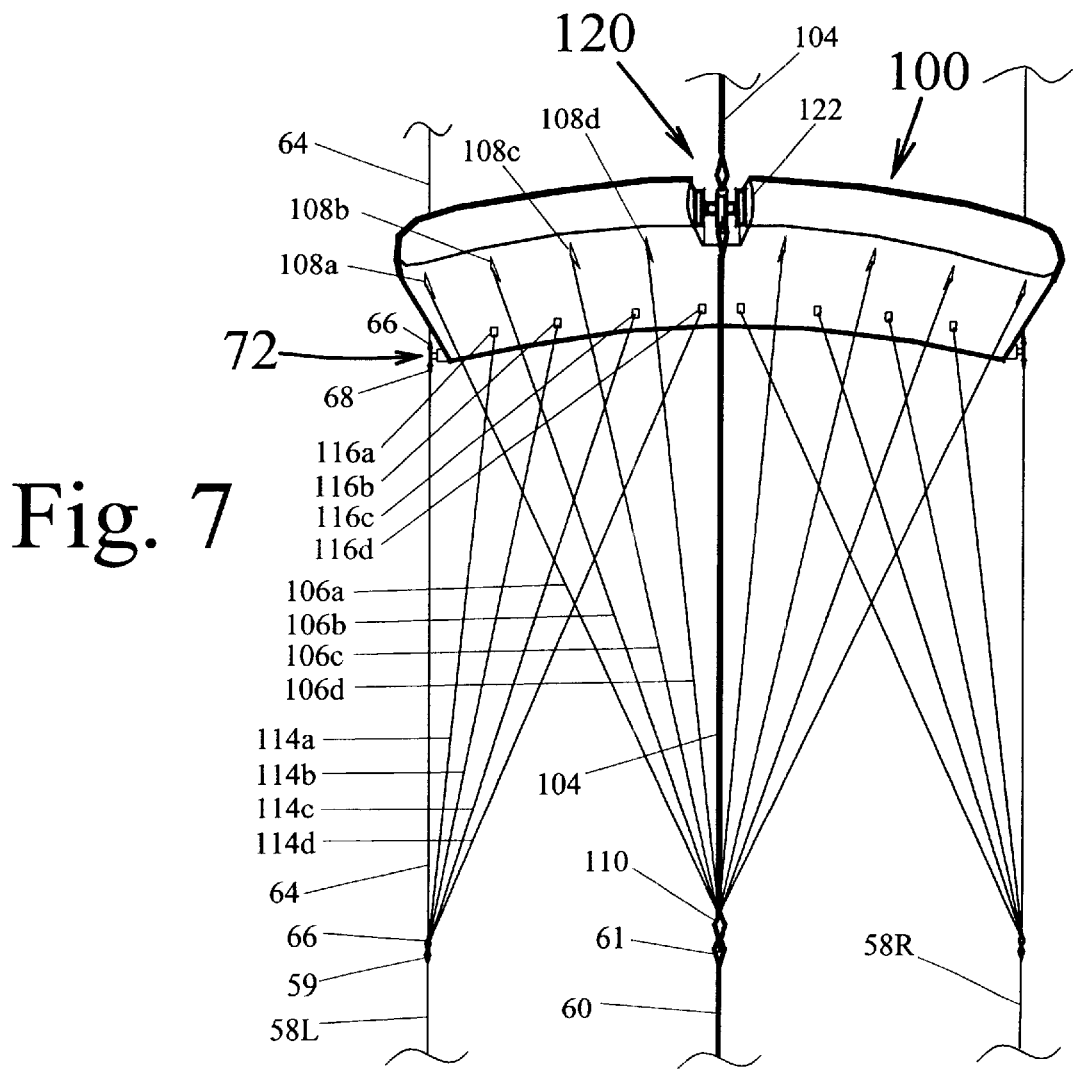

High-Efficiency Airfoil Kite ated at below ambient wind speed, and would produce 100 times less power than the Applicant's linear wind-turbine of similar size. Though the high-speed systems disclosed by Loyd and Payne use high-speed flight to capture wind energy, they do it in such a way that makes them unworkable by placing large-complicated machinery in its air vehicle or using pulley systems that make control nearly impossible.

AXIAL-MODE LINEAR WIND-TURBINE

CROSS-REFERENCE TO RELATED APPLICATIONS

This utility application claims priority from U.S. Provisional application Ser. No. 60/229,082, filed on Aug. 30, 2000 with attached Disclosure Document No. 443,908 filed on Sep. 3, 1998.

BACKGROUND—FIELD OF INVENTION

The field of this invention relates to devices that produce useful work from wind energy, and more specifically devices that extract energy from the wind using tethered kite structures.

BACKGROUND—WIND ENERGY

Collecting energy from the wind has been well know for more than 1000 years. However, nearly all wind energy has been collected near the ground. In recent years several designs have been proposed to take advantage of wind at higher elevation. The advantage of using high elevation wind is two-fold. First, wind speed is greater because boundary layer effects at the surface have less effect at high elevation. Second, there is a much greater volume of air flowing above 300 feet than below this elevation. In general, wind speeds increase with increasing elevation, however, the relationship is not always stable and can be much higher at night due to uncoupling of the air stream. According to the National Weather Service, average wind speed in the US is three times faster at 853 feet than at 15 feet.

Estimating total wind energy is difficult because not all available wind is economical to capture, plus, there is no consensus from the scientific community on exactly how much total available wind energy there is. Estimates of total wind energy is placed somewhere between 0.25 percent and 3.0 percent of the total solar radiation intercepted by the earth (Solar total=$10^{18}$ kWh/year, 1% Solar Total=$10^{16}$ kWh/yr). It is estimated that a practical wind energy of $20 \times 10^{12}$ kWh/year could be recovered over strategic land areas, and would represent a 4% land utility and 23% capacity factor for standard wind turbines. This translates into a savings of 100 million barrels of oil per day, should all this potential be exploited. The proposed Lift-Mode Linear Wind Turbine (or simply Linear Turbine or Lift Turbine), has far more wind energy available to it than a standard wind turbine. This is because can it operate economically in very low wind speeds, and can collect energy from the wind well above 300 feet elevation, and possibly to 3,000 feet, with similar heights over water. Since wind energy increases with the cube of air speed, higher elevation wind would have a much greater mean energy density than wind near the ground, and have a much greater volume of air available to it. The Linear Turbine is also well suited to operation at sea because of its low center of gravity and very low turning moment. The result is that wind energy available to a Linear Turbine is enormous. For comparison, world energy usage is $400 \times 10^{15}$ Btu per year or about $1.2 \times 10^{14}$ kWh/year including coal, oil, and gas. A conservative estimate of wind energy available between 300 and 3,000 feet elevation is $10^{15}$ kWh/year or about 10% of the total available wind energy. Most of this wind is high energy density (above 300 W/m$^2$), and viscose interactions within the air flow would allow drag effects to recover wind energy well above 3,000 feet as multiple systems slow the entire air stream. If 10% of this available energy was recovered ($10^{14}$ kWh/yr), there would be enough energy to displace nearly all current world energy usage.

SUMMARY

The linear wind-turbine disclosed here has many advantages over all other wind generation system. The power density of the disclosed invention is over a hundred times greater than other prior art self-erecting wind energy systems. Systems such as those disclosed by inventors Carpenter, Lois, Loeb, Ockels, and Payne all operate at below ambient wind speed, and would produce 100 times less power than the Applicant's linear wind-turbine of similar size. Though the high-speed systems disclosed by Loyd and Payne use high-speed flight to capture wind energy, they do it in such a way that makes them unworkable by placing large-complicated machinery in its air vehicle or using pulley systems that make control nearly impossible.

The Applicant's linear wind-turbine system operates under novel physical principles and is the only known example of a greater-than-ambient-wind-speed energy device that collects wind energy by movement in the AXIAL direction. The AXIAL direction being defined as the direction perpendicular to the airfoil's flight direction (not including the AXIAL movement itself), in the same plane as the LIFT and DRAG force vectors. For the special case where the airfoils rotate about a fixed point (see ground station 30 in FIG. 2), the AXIAL direction is in the same direction as the radial vector in spherical coordinates with its vertex centered at the fixed point (pivot point of control lines in ground station 30). For other non-spherical systems, such as Payne's design U.S. Pat. No. 3,987,987, the AXIAL component is simply the component of LIFT perpendicular to the airfoil's flight path which does no work in Payne's design. AXIAL wind-turbines represent a completely new way of collecting wind energy. The combination of AXIAL energy collection and high-speed operation, provide the linear wind-turbine system with advantages that no other system can match, i.e. extremely light-weight devices, simple flight controls, and very-high power density.

Snow and ice would stop any low power wind kite system, but the disclosed design has the high power density that can handle nearly any adverse weather. Other advantages include high elevation operation which makes available the collection of energy from a much larger percentage of the total wind energy on Earth. Expensive components of the Linear turbine remain on the ground and protected, only the airfoils are exposed, with all heavy components of the system placed on the ground. This allows buoyant airfoils to be used. Also, because of the very low center of gravity for the system, it can easily be placed at sea with the addition of a few control systems to compensate for the added rocking motion of the platform due to waves. Since the control system is already designed to handle a wide range of control line movement, making the flight control system insensitive to rocking and rolling of the ground station (sea station) is relatively straightforward. The design allows easy lowering the buoyant kites by either reeling them in or by controllably flying the kites to the ground for easy replacement or repair.

PRIOR ART

Many lighter-than-airships have been proposed for collecting this energy; but lifting an entire windmill and generator into the sky is expensive at best. These large airships are also susceptible to damage even in mildly strong winds making this type of system an extremely uneconomical method of collecting the wind energy.

Lois U.S. Pat. Nos. 3,924,827 & 4,076,190, Loeb U.S. Pat. No. 4,124,182, and Carpenter U.S. Pat. No. 6,254,034

B1 disclose devices for collecting wind energy using airfoil wings which produce drag for playing in and out a line attached to a pulley. While these inventions look similar to the Applicants invention, they are in fact missing key structures needed to allow the approximately 100 fold increase in power density that the Applicant's invention provides. Lois, Loeb and Carpenter use drag wind force on the kites (airfoil, wing, aircraft) to produce power, with lift coming from wind flowing around the kite. Lois, Loeb and Carpenter all realize maximum power at kite speeds equal to approximately one-third the wind velocity. These kite designs operate due to drag forces from direct wind resistance created by the wing. This operating criteria greatly limit the amount of energy collected because the kite must move generally in the direction of the wind. Carpenters design attempts to maximizes this drag by placing the airfoil (aircraft) at an angle-of-attack just beyond aerodynamic stall where turbulent airflow around the kite (aircraft) would create significant drag (called lift by Carpenter) to force the kite to move downwind. The Applicants invention on the other hand operates the airfoil (kite) at high-speed, with its airfoil moving substantially perpendicular to the wind stream (Lois, Loeb and Carpenter all have the kite move generally parallel to the wind stream). This high-speed operation allows the airfoil to interact with wind energy over a very large area, thus collecting many times the energy that Lois, Loeb or Carpenter's wing could ever hope to collect. For Lois, Loeb, or Carpenter's invention to operate like the Applicants, they would have to modify their kite design to have: 1) a high lift-to-drag (L/D) ratio; something that would lower the efficiency of Lois's and Carpenter's designs since they both rely on drag for power, 2) a means to make the wing operate at high-speeds (significantly above the ambient wind speed), and 3) a means to control the flight-path of the kite as it moves perpendicular to the wind at high-speed. Lois, Loeb, and Carpenter instead shows a slow-speed (slower than wind speed) wind energy device that uses DRAG to produce power, but does not control the wing to induce high-speed flight, or flight perpendicular to the wind. The result is that Lois, Loeb, and Carpenter realize a power density (power generated per unit wing area) of less than 1/100th that of the Applicant's design. That is, the Applicant's design can produce over 100 times the power for a given kite size and wind speed, than Lois, Loeb, and Carpenter's designs can.

All wings produce aerodynamic forces when moved through the air. These forces are spread across the entire surface of the airfoil and very in both direction and intensity for any given section of the airfoil. For simplicity all these forces are summed together and represented by a vector that goes through the center of moment of the forces on the airfoil. In practice, this single force vector is rarely used, but is instead broken into 2 perpendicular components, one called LIFT and the other called DRAG. In FIG. 1 we see, a schematic of the force vectors on an airfoil. The LIFT force is defined as the force on the airfoil perpendicular to the apparent airflow direction, and DRAG is defined as the force on the airfoil in the direction of the apparent airflow direction (effective wind direction). These LIFT and DRAG force vectors are chosen for convenience of calculating forces, and can be redistributed in other directions to allow calculating other factors of the airfoil. For example, the LIFT force component can be broken into an AXIAL force component (perpendicular to direction of travel) and a THRUST component (in the direction of travel). Since all high-speed wind turbines use the THRUST component of the forces to generate power this is an important force vector to know.

The AXIAL force vector is also important to know since it represents the force that must be resisted to keep a standard wind turbine from blowing away.

For the disclose invention, this AXIAL force is equal and opposite to the control line tension. It is this control line tension that produces the useful power. As the line is forcefully reeled out, it turns a pulley that turns a generator to produce electrical power. Since the control lines are perpendicular to the THRUST force, the airfoil is allowed to move freely in the direction of THRUST. After the airfoil reaches maximum speed, the DRAG on the unrestrained airfoil kite exactly cancels the THRUST component in steady-state flight. Thus, for the disclosed invention, all THRUST is used to either accelerate the airfoil or is dissipated by air DRAG force. On high LIFT-to-DRAG ratio airfoils, the AXIAL force vector is numerically and directionally nearly the same as the LIFT vector and will at times in this discussion be used interchangeably. For L/D=10 the AXIAL and LIFT vectors are only 5.7 degrees ($\alpha$=5.7°) apart when the airfoil is in steady-state flight. The angle-of-attack is defined as the angle between the chord line (line between the leading edge of the airfoil and the trailing edge of the airfoil), and the apparent wind direction. For this special case where THRUST and DRAG cancel, the angle-of-attack depends heavily on the lift-to-drag ratio of the airfoil, and for L/D=10 is equal to 5.7 degrees. This means that for the airfoil in FIG. 1, the chord line lies in the airfoil's direction of flight (or airfoil pitch angle equal to zero). Where airfoil pitch angle is defined as the angle between a plane perpendicular to the control line axis (direction of travel when not being reeled in or out) and the chord line of the airfoil.

The Applicants invention is the only known example of a wind energy collector where a high-speed airfoil is used to produce power through the AXIAL component of the aerodynamic forces on an airfoil. All other high-speed wind turbines and wind energy devices use the THRUST component of the airfoil's aerodynamic force to create power output. For example, on a standard wind turbine (spinning propeller), the rotor blades turn on an axis that is parallel with the wind. Thus, the blade's tips move perpendicular to the wind at very high speed and the AXIAL force component on the blades points directly downwind. This AXIAL force is resisted by the attachment of the rotor hub to a tower or other support. The THRUST component points in the direction of rotation for the blades, and produces the rotational force (torque) that turns the blades to produce power. All known wind energy systems which use high-speed airfoils to produce power, only use the THRUST component of their airfoils to generate power. Below are a few examples of such THRUST driven wind energy systems.

U.S. Pat. No. 3,987,987 to Payne is an example of a THRUST driven wind energy system. In FIG. 1a of his patent, we see Payne's typical design. A single line is attached through two pulleys with both ends attached to the wing (airplane). The nature of the system is that the wing is constrained by the continuous line to follow a parabolic path in the sky. Unless the line goes slack or the line is broken, the wing's flight direction must follow this parabolic path. All forces perpendicular to the flight path (AXIAL) are restrained by the line and pulleys. Thus, only the THRUST component on the wing (in the direction of flight), produces a differential tension on the two ends of the line to transfer useful energy to the ground. The Applicant's design on the other hand collects none of the energy produced by the THRUST and instead uses all THRUST to overcome air drag on the wing (airfoil kite) for high-speed flight. Power is instead collected by the letting-out of the tether line under the force created by AXIAL forces (LIFT) on the airfoil. The tether by its flexible nature can only exert a force along its length. Thus, only the AXIAL component which is in-line with the axis of the tether can transmit force to the ground and thus generate power. Payne's system, however, uses only the THRUST component to produce power, which is perpendicular to the AXIAL component used by the Applicant. Payne also uses airplane like controls to control the flight path of the airplane. This adds bulk to the airborne portion of the system and makes it more difficult to keep aloft. Payne does elude to the use of kite type controls but gives no examples, only saying they are common. This is true for kites with fixed lines connected to a static point on the ground, but it is completely unknown technology on how to control a kite that varies in distance from any given point on the ground. Since the kite would follow a parabolic path, their is no central axis where static control lines can be positioned, thus any control from the ground would have to be able to adjust not only for changing distance from the kite, but also changing angles of flight path with respect to the ground controller. Such controls are still an unknown. So while Panye shows a parafoil kite for use in his system, he neither shows a means of accomplishing this, nor is their any prior art that could easily allow him to control the parafoil under such conditions.

This application discloses how to make a control system for controlling an airfoil shaped kite with a changing tether length. The technical requirements for the disclosed system are less complicated than Panye's design which would need to control multiple changing axis in its flight path. For example, because the applicant's design follows a generally spherical flight path there is no need to have to adjust the pitch angle (angle between the chord line of the airfoil and a plane perpendicular to the control line axis) with respect to the tether control lines (Panye's design does not have this luxury), because the airfoil is always flying perpendicular to the tether. Minor changes in airfoil's angle-of-attack can be added to provide even higher efficiency by compensating for the small changes in apparent air flow direction. These changes in airflow direction can be the result of many factors such as air turbulence, direction of flight of the airfoil, speed of the airfoil, relative motion of the airfoil with respect to wind direction, and etc. The disclosed system teaches a means of controlling all these factors by controlling the angle-of-attack (and pitch angle) of the airfoil.

U.S. Pat. No. 6,072,245 to Ockels shows a wind energy system which uses multiple airfoil wings to generate power. This design uses aerodynamic THRUST to produce power, and only operates the wings at less than ambient wind speed. The wing's leading edge is pointed substantially into the wind during operation. At first glance one may think that Ockels' design uses the lift on the wings to produce power, however, by definition, THRUST is the force component in the direction of motion of the aerodynamic wing. In Ockels case, the wings can only move along the path described by the cables connecting the wings, and thus by definition, only the THRUST component on the wings do useful work. The AXIAL component (force perpendicular to the THRUST) is restrained by Ockels' cabling structure and does no work. Because of this, Ockels device is very limited in the power it can generate from a given wing area. The Applicant's design in contrast uses a airfoil surface that points its leading edge substantially perpendicular to the wind creating useful force in the general direction of the wind, not perpendicular to it. From this point alone one can see that the Applicant's and Ockels' devices operate under completely different physical conditions, and produce completely different levels of power output. The applicant's device may be operated at air speeds greater than 6 times the ambient wind speed. Since power in an airflow goes up as the cube of the airflow speed the Applicant's device will be interacting with air having an energy density 216 times ($6^3$) that of Ockels. Granted not all this energy is available for extraction, but neither is all the wind energy striking Ockels design at ambient wind speed available for extraction. Thus, all other factors being equal, the Applicant's design can generate over 100 times the power as a similarly sized airfoil using Ockels' design.

U.S. Pat. No. 4,251,040 to Loyd is another example of a THRUST driven wind energy system. In this case the thrust generated by a winged aircraft propel the aircraft at high-speed through the air. This high-speed flight is then used to drive propellers on the aircraft to produce useful power which is transmitted to the ground. The power generated by the propellers is taken directly from the forward motion of the aircraft in the form of drag. Thus, the power generated by the THRUST of the plane is collected by the propellers. The AXIAL force component on the wings of the aircraft is constrained by the cables connecting it to the ground and is not used to produce power. The Applicant's device, as mentioned before, operates exactly opposite Loyd's design using the AXIAL component to produce useful power and throwing away the energy generated by the THRUST component. By using the AXIAL forces instead of THRUST forces to produce power allows all the heavy linkages, propellers, and transmissions that Loyd uses, to be eliminated from the air-born portion of the design. This has many advantage which include making the system much lighter and easier to keep air-born. In fact, by eliminating these components the airfoil can be made so light that using an airfoil inflated with a lighter-than-air gas can allow the airfoil to actually be lighter-than-air. A buoyant airfoil has many advantages, one being that it can stay aloft even with no wind.

Linear Wind-Turbine Physics

Consider a typical wind turbine rated at one megawatt. It would have a 50 meter diameter rotor with two blades, reach a peak power at a wind speed of 15 m/s, and cutting off at 25 m/s. If we consider the outer 10 meters of each blade we find that these two small blade tips sweep out 64 percent of the turbine's area, and produce roughly 90% of the power output. Now consider removing these blade tips from the blades and discarding the remainder of the blades, its rotor hub, the nacelle, and the tower (representing 57.5% to 73% of total turbine cost, including land costs), and replacing all this with a system of inexpensive cables. These cables allow the blade tips (or airfoils) to operate in a linear fashion, and at higher elevations (>300 feet) where the power density of the wind is much greater. Furthermore, because the airfoil tips are not constrained to a circular path, they do not have the limited area of wind capture, increasing line length increases the collection area, thus sweeping a large area at high speed, and intercepting undisturbed air. The result is a system that has the potential to produce the same power, but at a lower wind speed, and at a much lower initial capital cost.

Linear Wind-Turbine System

The disclosed invention uses light-weight durable flexible airfoils operating at high lift-to-drag ratios and high speed. The airfoils are placed at the end of Control Lines (tethers) which are attached to a ground station (see FIG. 2). These Control Lines allow the airfoils to operate much like a high performance, controllable, stunt kite, except the control lines can be extended to collect power and retracted to repeat the process. At the end of each extension (power stroke) of the control lines, the airfoils are tilted toward the wind (airfoil pitch angle negative) to easily retract (rewind) the airfoil for the next power stroke. The high-speed flight of these airfoils can produce power levels similar to those experienced by large wind turbine rotor blades, except the airfoil kite would always experience full free stream wind speed, which would offsets any loss of efficiency due to improper orientation of the airfoil when it is not exactly perpendicular to the wind flow direction. Energy is collected from the fast moving airflow by allowing the airfoil's control lines to be reeled-out (played out) under the high tension (AXIAL force) on the lines. A pulley converts this linear motion into rotary power which is transmitted to an electric generator or other energy transmitting device, such as an air compressor, pump, etc. Thus, the control lines serve three purposes: 1) to support the airfoil's lift (AXIAL force), 2) to provide flight and lift control over the airfoil, and 3) to transmit power to the ground.

Figure 2:
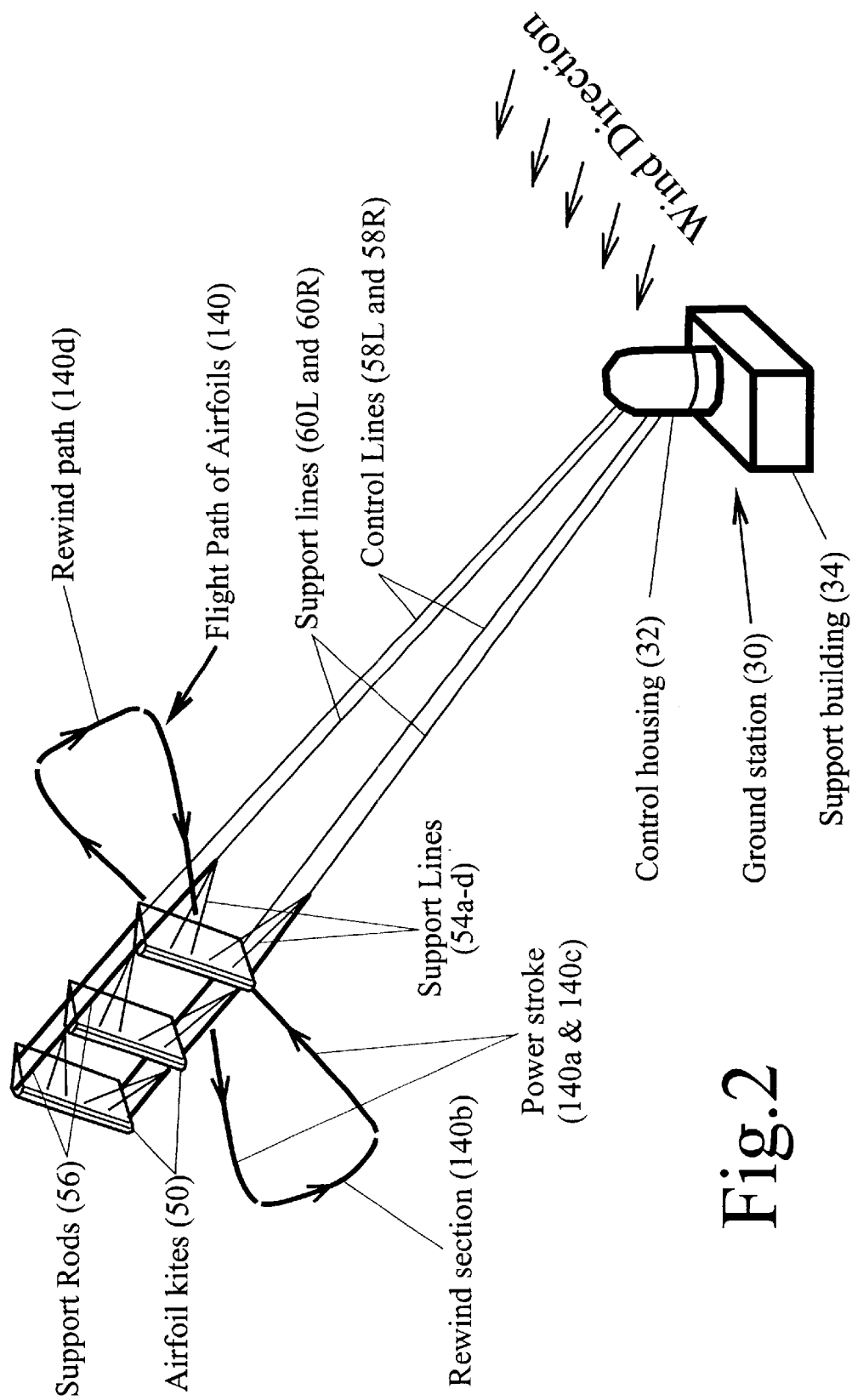

The art of controlling a self-erecting airfoil kite is well known with several different existing methods, two of which are dual or quad control line configurations. In FIG. 2 we see a Quad-line controlled airfoil. Such control schemes are used in present day high performance stunt kites. Quad-line control has the advantage that the angle-of-attack can constantly be controlled to optimization of power collection, to make adjustments for wind gusts, and to reduce power output in high wind conditions. The standard quad control line configurations must be modified for use here because the length of the control lines will not be static. Instead the lines will reel in and out so that useful power may be extracted from them. Such a control system is novel and will be described later in this discussion. The quad control line configuration places one control line near each of the four corners of the airfoil. A rigid spar is often used to support the airfoil, but in this design the pressurized airfoil tends to support itself, and support lines are added to assure the airfoil holds its shape. By changing the length. of the lines on the front and back of the airfoil, the pitch angle and angle-of-attack of the airfoil can be controlled. If the pitch angle on one side of the airfoil is reduced and the other remains the same, then the additional drag on that side will change causing a differential THRUST (and LIFT and pitch angle) on the two ends of the airfoil and will cause it to turn in flight. By this method the LIFT and flight path of the airfoil can be controlled by adjusting the length of the control lines to provide the proper airfoil angle. Being able to control the angle-of-attack also allows the airfoil to be throttled back in high winds. This is a great advantage because too much generated power can break the control lines or damage the airfoil. Quad line control allows the Linear Turbine system to remain operational over a much greater range of wind speeds and conditions than a standard wind turbine. The normal operating speed for the airfoil will be from 50 to 180 miles per hour. Thus, even wind speeds of 180 mph pose only minor problems for this system because the airfoil can be flown stationary in the sky and experience approximately the same forces as if it were sweeping across the sky at 180 mph in a 30 mph wind. To do this the airfoil must quickly adjust to high gust forces by changing its angle-of-attack, which can be accomplished by any one of a number of force control means like the quad-line configuration described above. Note that the stretch in the tether line itself will absorb some of the energy generated by wind gusts. Also the control lines can be let out more quickly to reduce the effective wind speed the airfoil experiences, thus reducing the forces.

DETAILED ENGINEERING DESCRIPTION

Before we go into great detail of the preferred embodiments, we should consider some of the physical properties involved which govern the operation of this type of turbine kite system. At this time it is sufficient to understand the general design for the turbine kite from FIG. 2. This system consists of three airfoil kites 50 in tandem which are attached to the Ground Station 30 by support lines 60L and 60R, and control lines 58L and 58R (collectively the support lines and control lines will be referred to throughout this patent as control lines). By controlling the differential length of these control lines, the airfoil's direction and speed can be controlled from the ground to follow the shown Flight Path. The control lines are also directly connected to a shaft and pulley system (see FIG. 12) in the Ground Station 30. As the Airfoil Kites 50 are propelled by the wind at very high speed, all four control lines are reeled-out under tremendous force causing the pulley and shaft in the Ground Station to turn a generator to generate electricity. The LIFT on the airfoil is linearly proportional to the power output of the airfoil, the more LIFT the more power. After the Airfoil Kites have made their: Power Stroke, the airfoil's pitch angle is made negative (pointing the leading edge into the wind) which immediately changes the angle-of-attack and slows the airfoil. The airfoil can now be reeled back in by the control lines with a minimum of force. Once the airfoil has been rewound to the proper place, the airfoils are again angled to generate powerful AXIAL LIFT. This process repeats over and over again to produce power. Since the force to rewind the airfoils is much less than the force generated during reel-out, there is net power generated.

The Linear Wind-Turbine system in FIG. 2 can be controlled through the cables coming from the ground station with two support lines 60L and 60R in the front, and two control lines 58L and 58R in the rear. While all four lines can be used to control the airfoil, it is generally sufficient to use just the two rear control lines 58L and 58R to adjust pitch angle and angle-of-attack. By adjusting the length of the control lines in the rear with respect to the support lines at the front, the airfoil's flight path can be controlled from the ground through differential drag caused by a different angle-of-attack on each side of the airfoil. Note that for an operational system all the lines may be bunched together in a single conduit between the airfoil and the ground station. The single conduit would reduce air drag on the lines, but would also add weight. There are many other methods available for control of the airfoil, but this one works well for present kite technology, and allows for quick adjustments in the pitch angle. The control lines constrain the lift generated by the airfoils and transmit most of the power to the ground station through an oscillating playing in, and out, of the support lines 60L and 60R, and control lines 58L and 58R (control lines). As the airfoils are propelled forward at high speed by the wind, the airfoil experiences LIFT. This LIFT causes the control lines to reel-out and turn a pulley-system on the ground, thereby transferring energy to the ground to generate electricity. Because of the slow turning rate of the pulley, a transmission may be needed between the pulley and the generator. A pulley and transmission in the Ground Station would be used to turn a generator. Power conditioning circuits would generate 60 Hz electricity from the generator's output. If two or more separate airfoil kites are connected mechanically they can be sequenced to produce their power stroke in succession providing relatively smooth turning of the pulley and generator. In this case, a synchronous generator may be used. Control for the generator's rotation speed would come from feedback to the generator which would control the turning rate of the pulley by electronically controlling the torque being generated by the generator. As torque increases on the pulley, the generator would increase its winding field strength to increase power output and keep the rotational speed constant. As torque decreases, the winding field strength would be reduced to allow the generator and pulley to rotate more easily to maintain its constant rotation rate. Thus, for a synchronous generator the play-out of the tether cables would always be at the same speed. This means that efficiency would be reduced because the power output is maximum at reel-out speeds of ⅓ the wind velocity. However, as we will see in the following text, this loss is relatively small over a fairly large range. Synchronous generator can also have two or more operating speeds to improve efficiency. Also, multiple gear ratio transmissions can be use used to help keep the control line power stroke speed near the range for maximum efficiency.

On very windy days the Linear Turbine may reach its maximum power. When this happens something must be done to reduce the power generated by the airfoil. A number of things can be done to reduce power. One is to simply changing the pitch angle of the airfoil as wind speeds increase. By changing the airfoil pitch angle with the control lines, the airfoil speed can be reduced to limit the output power of the airfoil. Another way to reduce power is to have the airfoils tack back and forth more closely near the zenith (vertical above the ground station). This causes the wind to hit the airfoil at a greater and greater glancing angle, thus reducing power collection by the factor $\cos^3(\theta)$, where $\theta$ is the angle between the wind direction and the longitudinal axis of the control lines at the airfoil. Power can also be controlled by using a combination of airfoil's pitch angle and changes in the $\theta$ angle. Eventually, at very high winds, over 120 MPH, the airfoil would remain nearly vertical above the power station, and simply oscillate up and down to produce power. The Linear Turbine would still be producing near maximum power as it tacked up and down in the 120+MPH wind. However, care must be taken not to loose control of the airfoil in these high wind conditions.

Energy and Power Physics

The power in an incompressible fluid flow has been shown to be proportional to the cube of the flow velocity. This makes sense when we consider the kinetic energy of an air flowing mass through an area A with velocity U.

$$\text{Wind Power} = \tfrac{1}{2}\rho U^3 A \qquad \text{Eq. 1}$$

$$\text{Lift} = L = \tfrac{1}{2}\rho V_r^2 C_L A \qquad \text{Eq. 2}$$

$$\text{Drag} = D = \tfrac{1}{2}\rho V_r^2 C_D A \qquad \text{Eq. 3}$$

Where, $\rho$=Ambient air density

U=Free stream Wind Velocity at airfoil

A=Projected Area of airfoil $V_r$=Airfoil's resultant air velocity

Analysis of an airfoil as a free translating body yields the power extracted as:

$$P_{Foil} = \tfrac{1}{2}\rho U^3 A(v/U)[C_L - C_D(v/U)][1+(v/U)^2]^{1/2} \qquad \text{Eq. 4}$$

Where, v=Velocity of airfoil $C_L$=Lift coefficient≈1.0

$C_D$=Drag coefficient≈0.1

$C_P$=Power Coefficient

L/D=Lift-to-Drag ratio≈10

It can be shown that maximum power occurs at $v/U=(2/3)C_L/C_D$ (i.e. 2/3 of the Lift-to-Drag ratio) for a lifting body. This 2/3 factor is true whether the power is being extracted by dragging a wind turbine behind the airfoil, or power is being extracted by the forceful playing out of the tether control lines. In either case, the maximum power coefficient for an airfoil translating at a right angle to the wind can be found from Equation 4 by substituting $(2/3)C_L/C_D$ in for v/U:

$$C_{P,\max} = (2/9)C_L(C_L/C_D)[1+(4/9)(C_L/C_D)^2]^{1/2} \qquad \text{Eq. 5}$$

$$= P_{\max} \Big/ \left(\tfrac{1}{2}\rho U^3 A\right)$$

Equation 5 gives the maximum power the proposed airfoil can produce given its values for $C_L$, and $C_D$. For airfoil motion off-axis with the wind direction (tether axis and wind direction are not aligned), power loss will result. For this discussion we have chosen reasonable numbers for the lift and drag coefficients, namely, $C_L \approx 1.0$ and $C_D \approx 0.1$. Substituting these into Equation 5 we get:

$$P_{out} = C_P\left(\tfrac{1}{2}\rho U^3 A\right) \qquad \text{Eq. 6}$$

$$= 14.85\left(\tfrac{1}{2}\rho U^3 A\right) \text{ at } v/U = 7.00$$

$$P_{\max} = C_{P,\max}\left(\tfrac{1}{2}\rho U^3 A\right) \qquad \text{Eq. 7}$$

$$= 14.98\left(\tfrac{1}{2}\rho U^3 A\right) \text{ at } v/U = 6.67 \; ((2/3)L/D)$$

$$P_{out} = C_P\left(\tfrac{1}{2}\rho U^3 A\right) \qquad \text{Eq. 8}$$

$$= 14.60\left(\tfrac{1}{2}\rho U^3 A\right) \text{ at } v/U = 6.00$$

Notice that in equations 6 through 8 the power output is relatively insensitive to the actual ratio of airfoil velocity (v) to wind velocity (U). This is good since the airfoil speed will be relatively difficult to maintain exactly. Also notice that ($\tfrac{1}{2}\rho U^3 A$) is the standard power equation for a fluid flow passing through an area A. Thus, our hypothetical airfoil can effectively collect almost 15 times the energy in the wind passing through the projected area of the airfoil, or almost 40 times the power of a standard wind turbine (38% efficiency) with a sweep area equal to the airfoil area, or 150 times the energy collected by a simple drag collector. We have chosen the lift-to-drag ratio equal to 10, which is much lower than most standard wind turbine airfoils which have lift-to-drag ratios greater than 20:1. If higher tolerances can be met, higher airfoil kite speeds could be achieved which would produce more power for a given size airfoil. For example, if the Lift-to-Drag ratio is increased to 15, then the power output increases to 50.25 ($\tfrac{1}{2}\rho U^3 A$). This power output is approximately 200 times greater than the best windmills using a drag sail or airfoil that interacts with the air at the ambient wind speed, such as, U.S. Pat. Nos. 3,924,827 and 4,076,190 to Lois, U.S. Pat. No. 4,124,182 to Loeb, and U.S. Pat. No. 6,072,245 to Ockels. The high-speed tacking of the Applicant's airfoil kite is what allows this high power rating and is a direct result of the airfoil interacting with a much larger volume of moving air.

From the example above we can see that small increases in the airfoil LIFT-to-DRAG ratio can greatly increase the total power output of the airfoil. Likewise, extra drag on the airfoil greatly reduces the total power output. Dirt on the airfoil and air drag on the control lines effectively reduces the LIFT-to-DRAG ratio of the kite by increasing the total drag on the system. Luckily, these drag forces become less and less of a factor as the system is scaled to larger sizes.

Figure 18:
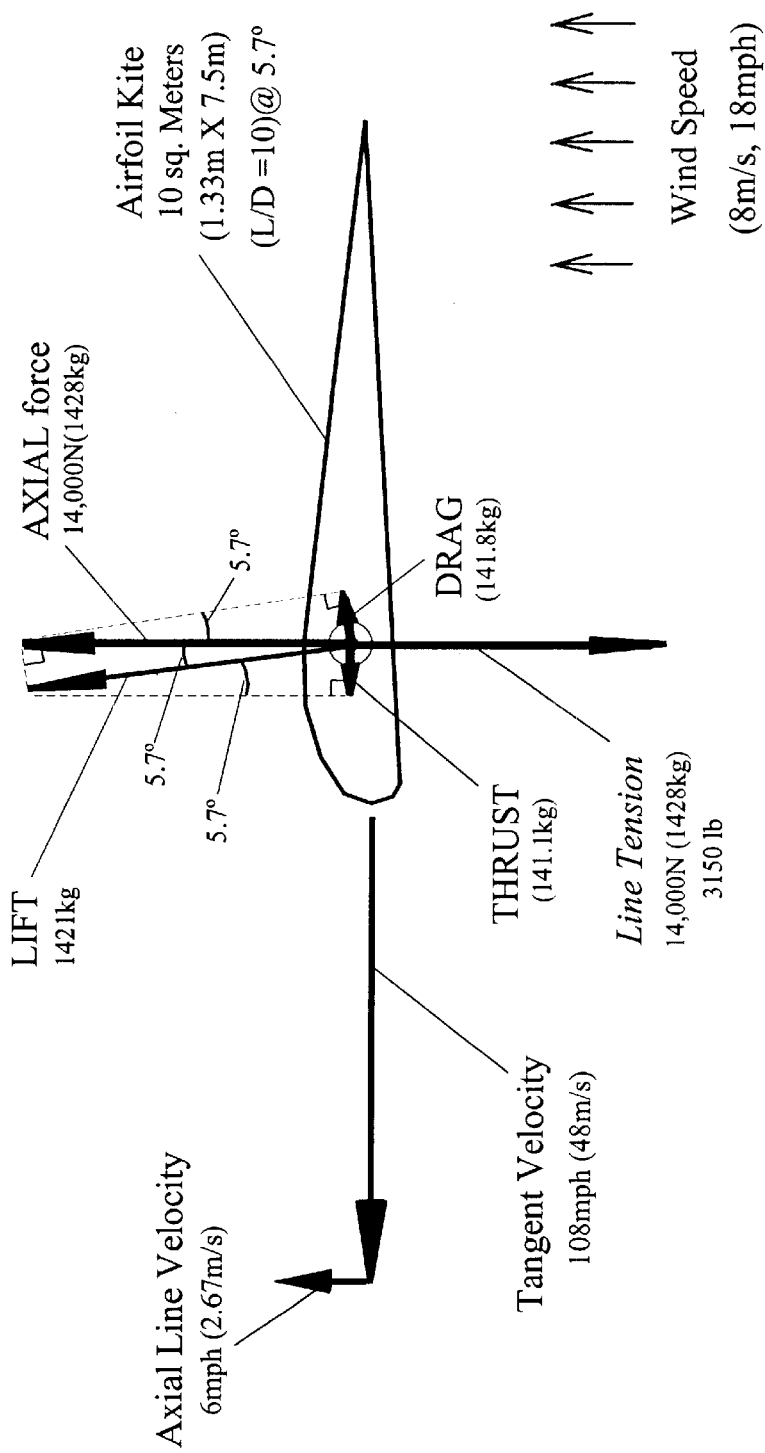

Let us now examine the power output of a hypothetical 1.33 meter by 7.5 meter airfoil (see FIG. 18 for a force diagram for this airfoil, and Table 1 for power data). The air density will be set at 1.0 kg per cubic meter (approx. 6,000 feet altitude), at lower altitudes more power is produced for the same wind speed. In this example, the airfoil's aerodynamic shape has medium surface tolerances to produce a LIFT-to-DRAG ratio of 10 (L/D=10 taking into account drag induced by the control lines, support lines, and other supports, which effectively reduce L/D to 10). Its efficiency at collecting wind energy will be estimated at 29% as calculated in Eq. 12 and Eq. 13. We will also choose its operating speed at 6 times the ambient wind speed which is near the optimum power producing speed for an airfoil with a lift-to-drag ratio of 10 (note that the chosen operating speed is slightly below the optimum 6.67 times wind speed). Even with this rather small inefficient airfoil, we still obtain an impressive amount of power from the system. The airfoil produces its maximum rated pull (AXIAL force) at an ambient wind speed of only 12 m/s. Above 12 m/s wind speed the airfoil would need to be throttled down to prevent damage to the kite. This is done in at least two ways. First, one can change the airfoil's pitch angle so its LIFT is effectively reduced. By this method, the power output of the airfoil can be held relatively constant up to and above 100 mph winds at which point the airfoil will have a more difficult time compensating for the extra power. Second, the airfoil can be "throttled" by simply increase the rate at which the control lines are reeled out. By increasing the reel-out rate, the effective wind speed is reduces and so are the forces associated with the airfoil and control lines. This faster reel-out of the lines also has the advantage of increasing the power output for the same maximum line tension. Thus, power output can still be increased as wind speed increases as long as the ground station components (pulleys, transmission, generator, etc.) can handle the extra power.

TABLE 1

Theoretical power output for a 1.33 meter by 7.5 meter windmill kite (see FIG. 18), with air density($\rho$) = 1.0 kg/m$^3$, L/D = 10

| Wind Speed at a 5 m elevation m/s (MPH) | Wind Speed at Airfoil Elev = 250 m m/s (MPH) | Airfoil speed (6 times wind speed) m/s (MPH) | Total Airfoil Power (Watts) $14.6(\frac{1}{2}\rho AU^3) = 73U^3$ | Airfoil Electrical Power Output Eff. = 29% (Watts) |
|---|---|---|---|---|
| 1 m/s (2.3) | 2 m/s (4.5) | 12 m/s (27 mph) | 584 | 169 |
| 2 m/s (4.5) | 4 m/s (9.0) | 24 m/s (54 mph) | 4,672 | 1,355 |
| 3 m/s (6.7) | 6 m/s (13) | 36 m/s (80 mph) | 15,768 | 4,573 |
| 4 m/s (9.0) | 8 m/s (18) | 48 m/s (108 mph) | 37,376 | 10,839 |
| 5 m/s (11) | 10 m/s (22) | 60 m/s (132 mph) | 73,000 | 21,170 |
| 6 m/s (13.5) | 12 m/s (27) | 72 m/s (162 mph) | 126,144 | 36,582 |

TABLE 1-continued

Theoretical power output for a 1.33 meter by 7.5 meter windmill kite (see FIG. 18), with air density($\rho$) = 1.0 kg/m$^3$, L/D = 10

| Wind Speed at a 5 m elevation m/s (MPH) | Wind Speed at Airfoil Elev = 250 m m/s (MPH) | Airfoil speed (6 times wind speed) m/s (MPH) | Total Airfoil Power (Watts) $14.6(\frac{1}{2}\rho AU^3) = 73U^3$ | Airfoil Electrical Power Output Eff. = 29% (Watts) |
|---|---|---|---|---|
| 10 m/s (22.5) | 20 m/s (54) | 72 m/s (162 mph)* | 378,432** | 109,745 |

*Above 12 m/s wind speed, the airfoil speed and relative wind speed are held constant by reeling out the line faster.
**Power output is 3 times that at 12 m/s wind speed, because line tension is the same and reel-out speed is 3 times faster, 12 m/s instead of 4 m/s.

Two separate winds speeds are shown in Table 1, the wind speed at a height of 5 meters above the ground, and then the typical wind speed one would expect at an elevation of 250 meters. In studies it has been found that on average the wind speed at 250 meters is twice the wind speed at 5 meters elevation. The wind speed difference is the result of drag effects near the Earth's surface where of objects on the ground (trees, houses, etc.) slow the wind down. As the airfoil kite exerts force on the control lines and the control lines are reeled-out (extended), it produces useful power which can then be converted into electrical power. Since the kite is moving at approximately 6 times the wind speed, the airflow it interacts with has 216 times the energy density of the ambient wind, and 1728 times the energy density of the ambient wind near the ground. Consequently, a very small airfoil can collect a very large amount of energy from this airflow. Not all the energy collected by the airfoil kite can be converted to useful work because there will be losses in the conversion process which includes the stopping of power output while the airfoil kite rewinds. We will calculate the Electrical Power Output as 29% of the Total Airfoil Power as determined in Eq. 13. For a wind speed of 12 m/s (27 mph), the kite shown in Table 1 is producing 126,144 watts of power, and has an average electrical output of 36,582 watts after taking into account all losses. During the power stroke at 12 m/s wind speed (8 m/s relative wind speed), the control lines would be extending at about 4.0 m/s, and be rewound at nearly twice that speed. As wind speed increases to 20 m/s, the relative wind speed on the airfoil stays at 8 m/s while the reel-out speed increases to 12 m/s. The flight speed and forces on the airfoil are substantially the same as at 12 m/s wind speed, but because the reel-out speed is 3 times greater for 20 m/s wind, the power output is 3 times greater.

Since the Linear Turbine converts its linear power into output power by playing out the tether during its power stroke, the output power for the system is determined by the force exerted while the lines are being played out and the speed at which they are being pulled out.

$$\text{Power} = \text{Work}/\text{time} = \text{Force} \cdot \text{Distance}/\text{Time} \qquad \text{Eq. 9}$$

Distance divided by Time equals speed. So the Power produced by a line being pulled out is simply:

$$\text{Power} = \text{Tension on line} \cdot \text{Reel-out Speed} \qquad \text{Eq. 10}$$
$$= \text{AXIAL Force} \cdot (1/3)\text{Wind velocity}$$

If we assume that the AXIAL force is approximately equal to the LIFT on the airfoil, and we assume the relative air velocity is equal to the airfoil speed then we get an approximate expression for the Power output in terms of the wind speed (U):

$$Power = \frac{1}{2}\rho V_r^2 C_L A \cdot (1/3) U \quad \text{Eq. 11}$$

$$= \frac{1}{2}\rho (6.67 V_w)^2 C_L A (1/3) U$$

$$= 7.41 \rho C_L A U^3$$

$$= 14.8 \left(\frac{1}{2}\rho C_L A U^3\right)$$

Where,
U=Wind speed
$V_r$=Relative air speed
$\rho$=air density
A=airfoil area
$C_L$=Lift coefficient Notice that this value is slightly below the numbers calculated in Eq. 7 because of the error in the two assumptions we made: 1) AXIAL force is actually slightly larger than LIFT force used in the calculation, and 2) the Relative Air Speed is slightly higher than the airfoil speed because it is the sum of the airfoil speed and wind speed vectors. Thus, Eq. 11 is only approximate, but give a better physical feel for how energy is generated by the airfoil and transmitted through the cables. Note, that this power output only occurs during the power stroke of the kite and the average power is much lower because of losses, and nonproductive rewind times.

The operation and control of airfoils are well known, and the determining of the proper angle-of-attack and pitch angle for the airfoil to maximize power output is straight forward as calculated above in equations: 1 through 11. However, under conditions of varying wind speed, and airfoil speed, calculating the proper angle becomes more difficult and the discussion of these more exact equations is beyond the scope of this application, but such equations are well known in the field of aerodynamics and wind turbine power.

Losses

As with any system, the Linear Wind-Turbine will have losses that reduce output power. Each loss will be given a coefficient of efficiency that can be used to calculate the net power output by multiplying them together. The major losses can be broken down into seven areas:

1) $C_\theta = \text{Cos}^3(\theta) = 0.65$ Losses from off-axis alignment of the airfoil with the wind direction. The wind strikes the airfoil at an angle effectively reducing the apparent wind speed, and since power is proportional to the cube of wind velocity we used Cosine cubed to determine the losses ($C_\theta = 0.65$ represents a value $\theta = 30$ deg). Thus, the collectable power is reduced by the cube cosine of the off-axis angle.

2) $C_{drag} = 0.90$ Losses from drag induced by the tether and control line. Losses here are small because drag on the lines can be minimized by making the Linear turbines larger.

3) $C_{rewind} = 0.90$ Losses from energy needed to rewind the tether after power stoke. In order to rewind the airfoil, power must be used. With a high-efficiency airfoil the rewind force can be hundreds of times less than the power stroke tension, but will still require an electric motor or other device to power the rewind.

4) $C_{down} = 0.68$ Losses due to time needed to rewind the tether (effects average power). Because no power is produced during the rewind phase this effectively lowers the average power output of the system 5) $C_{trans} = 0.95$ Losses within the pulley and transmission. Since the pulley and generator could be attached directly this loss can be very small. If a step-up transmission is needed this coefficient could increase to 0.85.

6) $C_{gen} = 0.85$ Losses within the generator and power conditioning equipment. Any generator will have losses, however, if an asynchronous generator are used additional power converters will be needed to convert the non-matched current to the 60 Hz standard found on the US national power grid.

7) Airfoil DRAG losses—*Note that losses due to drag on the airfoil are taken into account in $P_{max}$ (and $P_{out}$) from the Power equations (Eq. 5 through Eq. 8). The fact that the airfoil operates while the control lines are let out reduces the effective wind speed which is taken into account in the calculation of $P_{max}$ (and $P_{out}$).

Thus, the equation for maximum net output power is:

$$P_{net\ max} = [C_\theta C_{drag} C_{rewind} C_{down} C_{trans} C_{gen}] P_{max} \quad \text{(Eq. 12)}$$

If we assume an average $\theta = 30$ deg. (Cosine cube average), and non-ideal operating speeds of the airfoil, then the total net average power would be given by:

$$P_{net} = [(0.65)(0.90)(0.90)(0.68)(0.95)(0.85)] P_{out} \quad \text{Eq. 13}$$

$$= 0.29 P_{out}$$

Equation 13 shows that nearly 30% of the available power from the airfoil kite can be collected as useful electrical energy by this method of repetitive power-stroke and rewind. It should be noted that the time needed by the Applicant's airfoil to rewind itself after each run is the second largest loss to average power output for the system (32% of time spent rewinding the control lines). This is conservative since airfoils have very low drag when pointed directly into the wind, which means it can be rapidly rewound using a minimum amount of force. With a faster rewind speed the $C_{down}$ loss can be decreased, thus directly resulting in greater average energy production. However, as rewind speed increases so does the power requirement for the rewind, thus Crewind loss will increase as rewind speed increases, but the losses due to rewind are small compared to the power gained by having the airfoil spend more time in a power stroke (at least to a point).

The system drag loss ($C_{drag}$ due to the control cables (tethers) has been estimated at 10%. As the airfoil systems get larger this drag component becomes less and less of a factor because air resistance on a cable goes up linearly with its diameter while the strength of the cable increases with the square of its diameter. This factor ($C_{drag}$) also takes into account other drag losses such as those due to the airfoil curvature changes in flight, dirt on the airfoil (lowers lift-to-drag ratio), and flutter. DRAG on the control lines creates a force resisting the THRUST generated by the airfoil. This DRAG effectively reduces the lift-to-drag ratio of the airfoil kite and thus reduces the flight speed which reduces the power produced.

Operational Parameter

An airfoil generates the most power when it travels perpendicular to the wind (control lines parallel to the wind). When it moves away from this aligned state by rising into the sky, or flying horizontally, the wind strikes the airfoil at an angle. The greater the angle, and the less power the airfoil can generate. This loss can be attributed to a reduction in the effective wind speed, which is approximated by the Cosine of the angle $\{V_{e\!f\!f}=U \cos(\theta)\}$, where $\theta$ is the angle between the control line force vector at the airfoil and the wind direction. From this simple equation we can see that the airfoil power will be proportional to "$\cos(\theta)$ cubed" because the power is proportional to the effective wind velocity cubed. The power generation factor $\cos^3(\theta)$ is an approximation because it does not take into account such things as direction of airfoil flight, deformation of the airfoil, changes in L/D ratio, and other factors which have a small effect on a well designed airfoil kite. Note that the 36.5 kW airfoil (at 12 m/s wind) in Table 1, already assumes operation at $\theta=30$ degrees (cube average) within the estimated 29% efficiency. At first glance this loss in power seems to greatly handicap the system as it would a standard wind turbine which does not track the wind properly. However, for a Linear Turbine the actual disadvantage is very small for two reasons. First, for high-elevation flight, the airfoil control lines will need to be angled at around 30 degrees with respect to the ground. The airfoils can operate at much lower angles, but because wind speed increases with height, it is actually an advantage to collect power at higher elevations. Second, it is easy, and relatively inexpensive, to add more airfoils to the system to bring the system back up to power, without upgrading the Power Platform, control lines, or generator. The loss of LIFT due to off-axis orientation is compensated for by simply having more airfoils.

Adverse Conditions

Hail, Snow, Rain, and Freezing Rain are potential problems for a Linear Turbine. The control lines are not easily damaged by hail, and snow and freezing rain would have a hard time collecting on the lines because of the dynamic nature of the their operation. Vibrations, bending and stretching all would tend to shake off any precipitation that would collect on them. If freezing rain or ice should become a problem the flexible nature of the airfoils and the ability to precisely control the flight path and speed of the airfoils allows a simple solution. The airfoils can simply be put into a controlled dive and crash into the ground at 20 to 30 mph without damaging the pliable airfoils. The impact would be more than enough to shake loose any snow or ice from the flexible slick plastic surface. Non-absorbent control-lines would aid in limiting the loading effects caused by snow, rain and freezing rain. The airfoil itself would need to have a reinforced leading edge to protect it from hail damage. The airfoil must also have a slick outside coating to allow vibrations and stretching of the fabric to dislodge any snow or freezing rain that might collect. The slick, high-puncture resistant, multi-layer material used to make modern white-water rafts seems perfect for this use. The material would be very durable and air tight allowing the inflation and pressurization of the airfoil with lighter-than-air gasses. It may be necessary to cover this entire structure with a thin flexible membrane which can expanded from time to time with air pressure; heating elements are also a possibility. A completely sealed and pressurized airfoil seems like the only workable kite system that could be make relatively maintenance free and still be lighter-than-air, and resist the elements. Also, during the winter season the entire system may need to be sprayed with Teflon or oil once a month to improve the removal of ice and snow.

Heavy Winds pose only minor problems for this wind system because of its normal operating speed above 120 mph. Through proper control of the airfoil's angle-of-attack, pitch angle, reel-out line speed, and angle above the horizon, there is little problem keeping the airfoil producing power well above 100 mph wind speeds. Turbulence at these high wind speeds may require one-board systems to make very fast adjustments to the airfoil's LIFT to prevent damage to the airfoil and lines. All these problems can be overcome simply by increasing the rate at which the airfoil is reeled-out during the power stroke. Increasing the reel-out speed reduces the effective wind speed the airfoil "sees". Thus, the relative wind speed can be maintained below its maximum static wind speed even in very high wind conditions, provided the pulley system and generators can withstand the increased rate of line reel-out. Throttling the airfoil in this way has another advantage, which is the airfoil generates much more power because of the increased line speed without additional stress on the airfoils or control lines. The combination of increasing Cosine cubed losses, increasing line reel-out rate, and reducing angle-of-attack (and/or pitch angle) of the airfoil combine to provide good control over the airfoils even in very violent wind storms.

Lack of Sufficient Wind to keep the airfoils aloft, and turbulent wind conditions where angle-of-attack is constantly changing cause problems. These problems can be handled with proper line and tensioning control, which would reel the airfoils in when the wind stopped. Also, because the airfoils have no other components on them, it is possible to make them buoyant with lighter-than-air gasses. Thus, even if the wind stops the airfoil kite does not need to be reeled in.

Ultraviolet Radiation from the sun is another potential problem. The outer surface of the airfoil as well as the cables must be able to resist this damaging radiation. Materials that deteriorate in sunlight must be avoided or coated with a ultraviolet resistant material. For the cables stainless steel piano wire or carbon fiber cables might be used. If more exotic cabling is desired the cables can be coated to protect them. For the airfoil, a simple exterior coating would be all that is needed to protect the high strength plastic.

Figure 3:
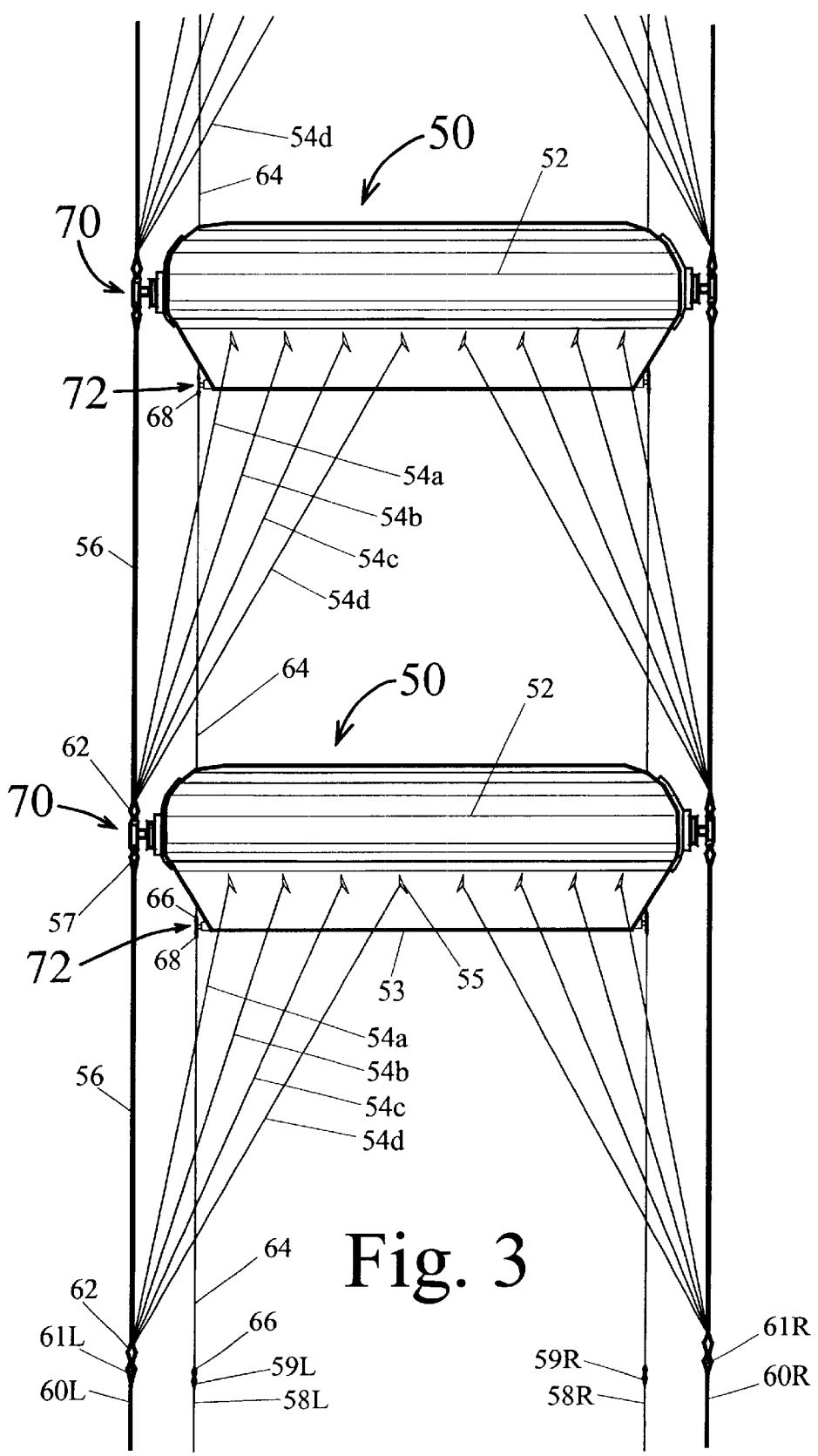

Turbulent Air can also cause problems. Since the airfoils are essentially high-speed kites, there is always the chance of the lines getting tangled. To prevent this several measures can be taken. First, as heavier and heavier control lines are used on larger and larger systems, it becomes less likely the lines will be to accidentally twisted since the size of the systems mean much slower reaction times are needed from the automated control systems. Second, the airfoils are not passively inflated like many para-foil kites are by air-ram effect. Instead, the applicant's is inflated and pressurized so that they hold their shape even under strong forces. Third, active tensioning of the control lines keeps a minimum tension on the lines. If tension drops below a certain level, the airfoils are reeled in to prevent tangling of the lines. Forth, airfoils can be chained together in tandem to provide added stability. If one airfoil should loose lift due to turbulence the others can keep the train of airfoils under control (see FIG. 3). Fifth, the connectors between airfoils in, tandem are made semi-rigid so that the train of airfoils retain their shape even without active lift. In FIG. 3 we see two airfoils 50 in tandem with more airfoils attached above them. Connectors 56 and 64 are used to connect the airfoils together (note only left side of drawing is numbered, and the right side is the mirror image of the left side). If connectors 56 and 64 are made of a carbon fiber rod (slightly curved to dissipate compressive forces), then the airfoils will not only resist being forced apart but also resist being pushed together, or twisting around each other. Thus, making connectors 56 and 64 semi-rigid helps prevent the airfoils from getting tangled.

Lightning is the final hazard presented here. For large systems this is not a problem, as the Cable and Control Lines could be made of wire cables large enough to be undamaged by the flow of electricity caused by lightning. For smaller systems it may be necessary to bring them down during lightning storms. However, the use of non-conductive, water-repellant lines combined with the fact that the control lines are substantially horizontal to the ground may prevent lightning strikes from being a problem. Conversly, lightning rods and conduction paths on the airfoil kite itself could also be used to prevent damage.

Commercial/Economic Potential

According to the US World Atlas over half of the US land area has a power density greater than 200 W/m$^2$ at a height of 50 meters (5.6 meters/second). At 250 meters one can expect the power density to be over 2 times this (depending on local terrain), with an equivalent average wind speed of $U_{ave}$=7.3 meters per second. If ocean areas are considered we find that much of the open seas experience 500 W/m$^2$ or more and represents the majority of the wind energy on the planet. For an example of a workable system, we will use four(4), 1.33 meter chord by 7.5 meter length airfoils in tandem. The estimated output power from this system at $U_{ave}$=7.3 m/s is 8,450 watts, $P_{out}$=(0.29)[14.98($\frac{1}{2}\rho U^3 A$)], for each of the four airfoils for a total of 33.8 kW(kilowatts). These numbers take into account all the losses as shown in equation 12. Since power increases with the cube of wind speed, there is much more energy above this average wind speed than below, with 3 to 4 times more energy available above Uave even though such velocities are experienced less often. Thus, the actual average power output will be greater than the power at $U_{ave}$. For a typical wind speed distribution, the maximum Energy Density Frequency {(kWh/yr)/(m/s)} will occur at a wind velocity of approximately 150% of $U_{ave}$. When averaged out over a year it is experimentally found that average power is approximately 141% of the power at $U_{ave}$ (for $U_{ave}$ above 100 m elevation). This means that the four tandem airfoils will output 47.6 kilowatts on average, or 417,000 kWh per year. The airfoils themselves will have a maximum power of 150 kW, but for economic reasons, the Power Platform, control lines, control systems, and generator will all be matched to half this value, or 75 kW (4 airfoils), for the maximum rating. This effectively lowers the wind speed at which maximum power is reached from 12 to 9.5 m/s, and gives the system an estimated annual capacity factor of 41.2 percent. Even more power can be produced if we take into account increased power output at higher winds speeds by reeling out the line at higher speeds to maintain safe stress levels on the airfoil and lines. However, for this example, the airfoil's pitch angle is reduced to limit power output to the maximum rating 75 kW.

The 417,000 kWh/yr if sold at $0.05 per kilowatt-hour would return $20,850 per year. An initial break-even construction cost of $108,593 (not including interest during construction, inflation, variable annual costs, and taxes) would result if constructed with a 15 year-8% interest loan, and $5,000 per year operation and maintenance costs. The total capital costs of this small 4-airfoil Linear Turbine is estimated at only $48,000. The cost breakdown would be as follows: Airfoils—$1,000 apiece when mass produced, and weigh less than 15 pounds (not including lift due to lighter-than-air gases). Power Platform—$6,000 and built to last a decade or more, with precision sealed bearings and heavy construction. Control Lines—$2,000. Control linkage in Ground station—$10,000 and would be computer controlled. Computer controller—$8,000, the computer controller and program would be one of the most expensive components to develop. Variable Speed 80 kW DC Generator—$8,000, Power Grid Controller 80 kW—$6,000 for matching 60 Hz AC grid output (note that multiple airfoils operating in sequence to even out power could allow a constant-speed synchronous generator to be used, thus eliminating expensive electric power conditioning equipment). Finally, a small block house will be needed to house the generator and control systems at a cost of $3,000. At a total cost of $48,000, this works out to $1008 per average kilowatt output ($414 per installed peak kW, 41% utility), in a wind zone on the low end of a Class 2 site (average wind speeds from 5.6 to 6.4 m/s at 50 meter elevation). With $5,000/yr operational costs, $3,840/yr interest (8%), and $3200/yr principle, a kilowatt-hour of electricity would cost $0.017/kWh ($7040/417,000 kWh) for capital costs, and $0.012/kWh ($5000/417,000 kWh) for maintenance and replacement. This provides a total cost of $0.029/kWh. Present wind system have capital costs as low as $1,050 per kW ($0.03/kWh capital costs, and $0.01/kWh operating costs)[1] with a utility factor around 30%. In non-ideal wind zones these present day wind systems would produce electricity at $0.075 to $0.083 per kWh. Thus, this proposed system has approximately the same capital cost of the best wind farms, while operating at a higher utility factor, in a location with only one-half the wind energy density available, and accomplishes this in a very small sized system. As linear turbine systems are scaled to larger sizes the economics get even better. Thus, with such a low cost per kilowatt-hour, a Linear Turbine appears capable of competing economically with nearly any other form of energy, even with maintenance and replacement costs representing more than half of the cost of the system.

One final note: The Applicant purchased an airfoil kite to conduct experiments on this type of wind power generation. The small 7 foot long airfoil kite weighed only 8 ounces, but could operate at power levels above 8 horsepower without damage. That is, it can deliver 8 hp to the control lines on the ground in normal operation (40 mph wind speed, 20 feet/sec reel-out line speed, 220 pound line tension). This must be a record; the power output is an astounding 1 hp per ounce! I don't know of anything other than a rocket or turbojet engine that can produce that kind of power-to-weight ratio. If a typical 100 hp automobile engine had the same power-to-weight ratio it would weigh only 6 pounds (3 kg).

Scaling

Standard wind turbines suffer from bending moments which increase with the square of the blade length and blade thrust which increases linearly with blade length. Combining these two factors explains why there is problems with rotors more than 100 meters in diameter; forces increase beyond what material strength can support. Flexible airfoil kites do not suffer from this problem and actually require no increase in structural strength when scaling the length of the airfoil or scaling the number of airfoils in tandem, only the ground station and cabling need to be strengthened to handle the added power. The reason for this is that the airfoils can be divided into cells along its span(width) with each cell having its own support lines. This arrangement allows the airfoil to be made wider by adding more cells and lines without changing the forces acting on each cell. Power can also be increased by adding more airfoils in tandem which obviously does not increase the stress on the separate airfoils. Only the control lines, and ground station would need to be made stronger as power output increased. Increasing the chord of the airfoil, however, does require an increase in strength of the fabric the airfoil is made of. An airfoil's chord is defined as the distance between its leading edge and its trailing edge. The forces on the material increase linearly with chord length, but this in itself does not impose a limitation on the system size, it just requires proportionally stronger materials for larger airfoil chords. Because it is a linear relationship, there is no absolute maximum size for such an airfoil chord. Airfoil sizes of 5 meter chord and 50 meter length are certainly possible, and if stacked in a train of 40, such a system would produce 20 MW (2,000 W/m$^2$). Thus, at least on paper, Linear Wind-Turbines appear to be highly scalable to very large sizes.

Objectives of Advantages

Accordingly, several objects and advantages of my invention are:

a) This Turbine Kite system is able to reach high elevation air streams where higher velocity wind provides a much higher energy density than at the surface.

b) High elevation operation makes available the collection of energy from a much larger percentage of the total wind energy on Earth.

c) High speed operation allows a relatively small kite to collect a large amount of energy over a large volume of air.

d) Expensive components of the system remain on the ground and protected.

e) All heavy components of the system remain on the ground allowing buoyant airfoils to be used.

f) The airfoil acts like the tip of a normal rotor blade, the area of highest power generation, without the need for a large tower, expensive rotor hub and the rotor blades, which are all replaced with inexpensive control lines.

g) Very low center-of-gravity allows the system to easily be placed at sea.

h) The flight control system can be made insensitive to rocking and rolling of the ground station if placed at sea.

i) Quick and easy changing of buoyant kite trains for repair or inspection.

j) Continued operation even in extreme wind conditions above 100 MPH.

k) Production of power from the AXIAL component of LIFT.

l) Use of an inflated airfoil with lighter-than-air gas to provide buoyancy.

m) Use of semi-rigid spars between airfoil kites in tandem to prevent tangling and to keep the airfoils at the proper angle-of-attack even in turbulent wind.

n) To allow increase power output while at the same time reducing the stresses on the airfoil and control lines by reeling-out the control lines faster.

o) To provide a wind energy system which can be scaled to very high power levels.

p) To provide a single attachment point on the ground for the airfoil kites so that simplified flight controls can be used to control the airfoil's flight path.

q) To provide airfoil pitch angle control which can maximizes the LIFT-to-DRAG ratio of the airfoil during the power stroke phase.

DRAWING FIGURES

FIG. 1 Airfoil force vector schematic.

FIG. 2 Turbine Kite system with ground station showing one possible flight path.

FIG. 3 Preferred embodiment, tandem airfoil kites and linkages.

Figure 4:
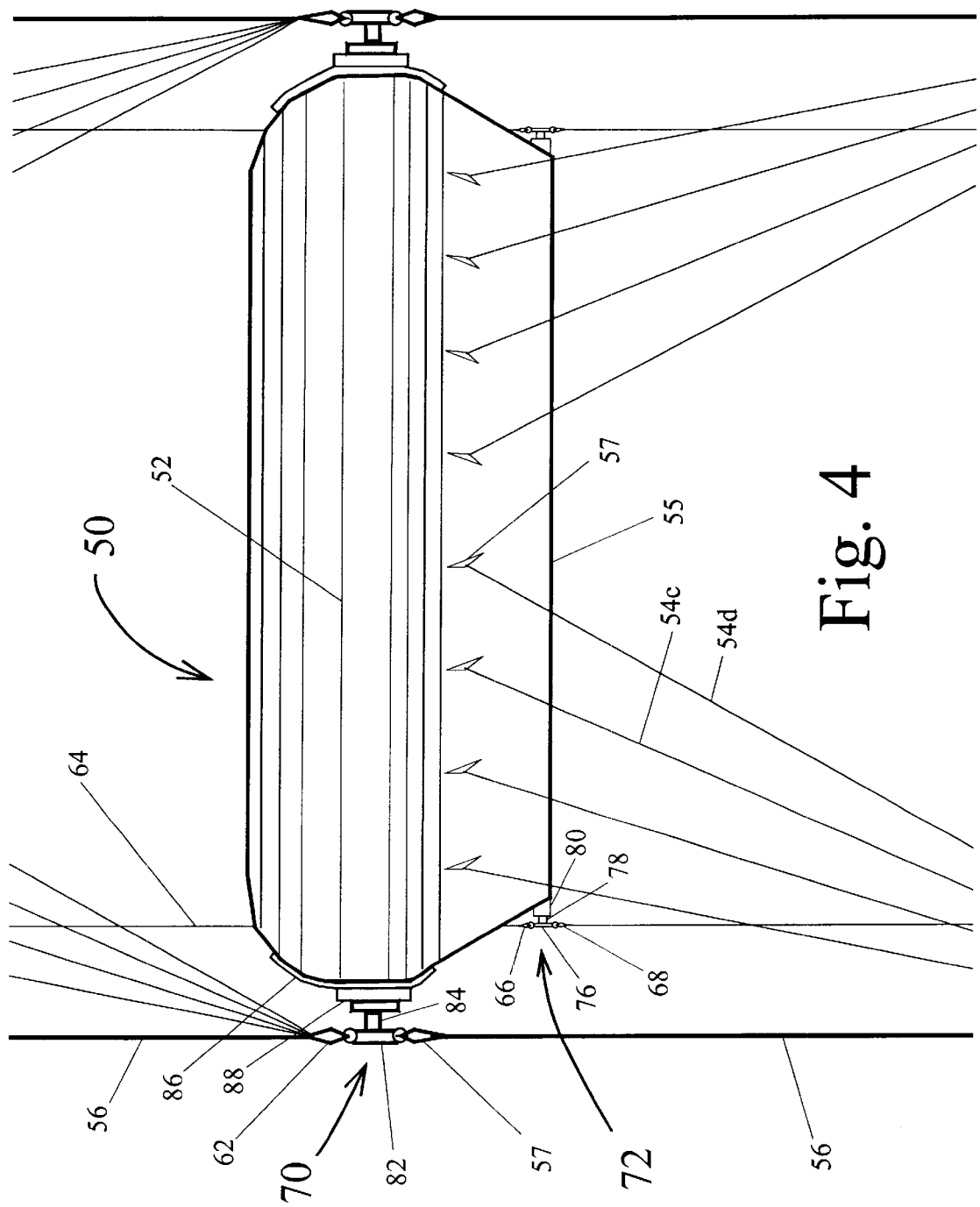

FIG. 4 Preferred embodiment, front view of Tandem airfoil kites and linkages.

Figure 5:
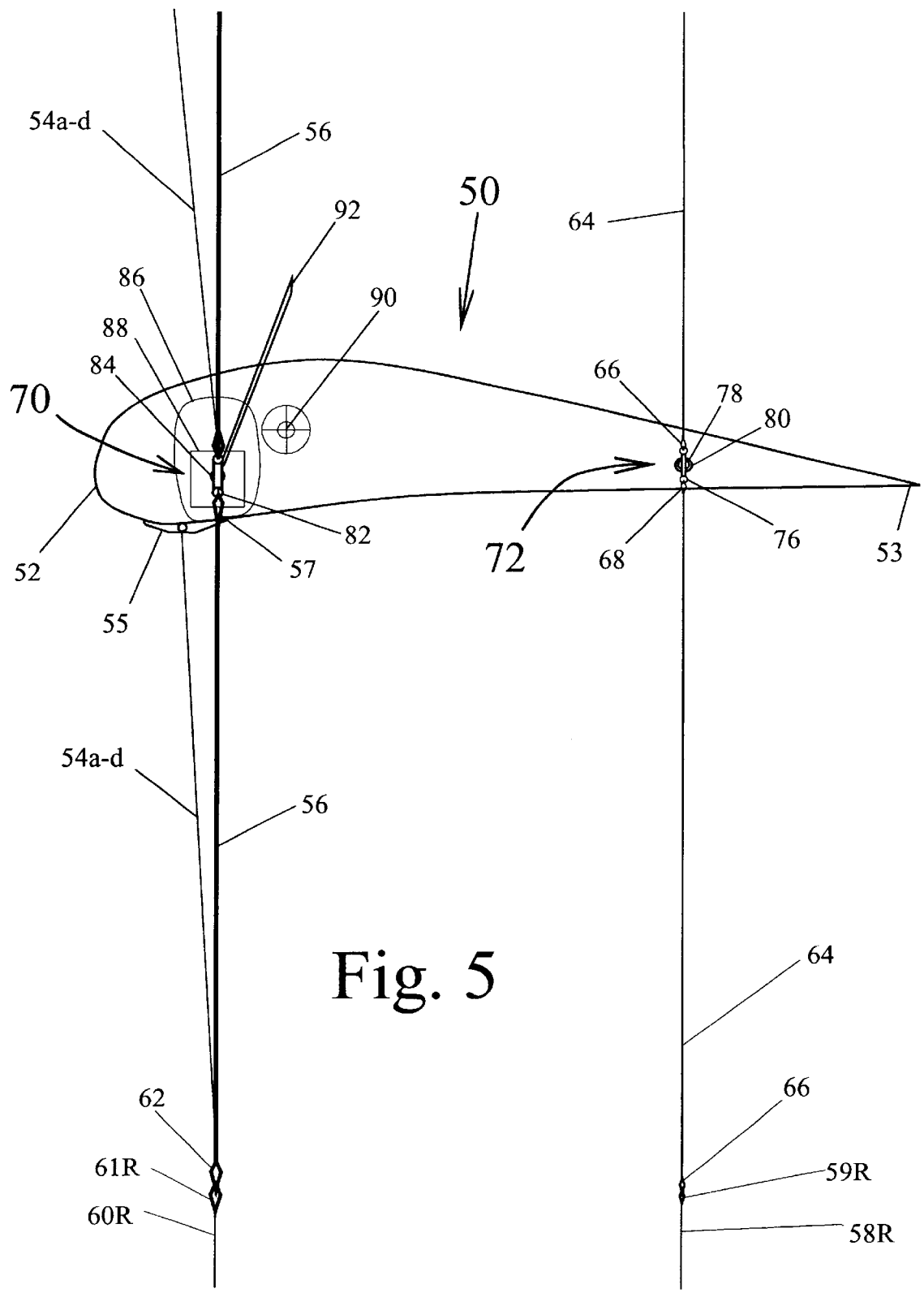

FIG. 5 Preferred embodiment, side-view with pressurized airfoil kite and linkages.

FIG. 6 Alternative 1 airfoil and linkage design top view.

FIG. 7 Alternative 1 airfoil and linkage design front view.

Figure 8:
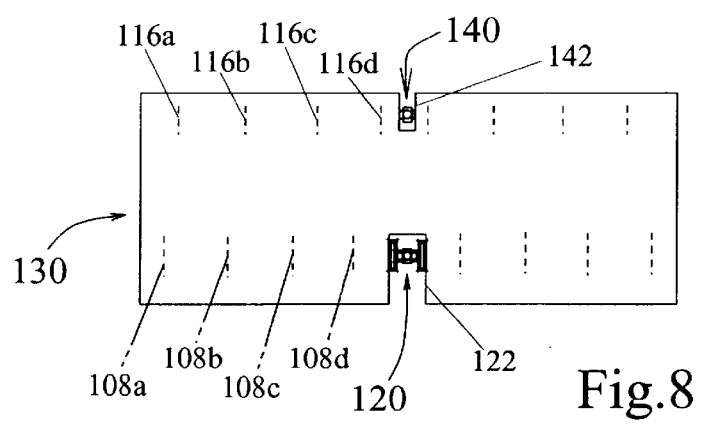

FIG. 8 Alternative 2 airfoil and linkage design top view.

Figure 9:
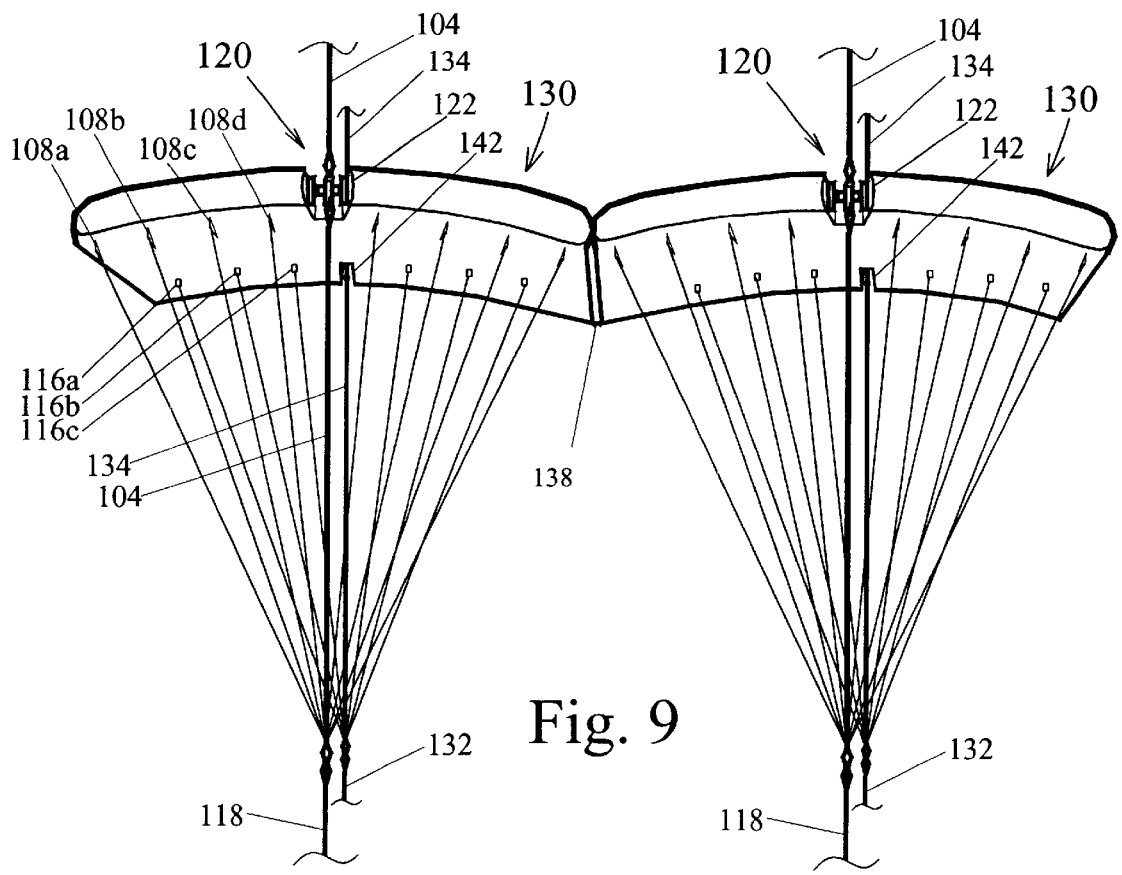

FIG. 9 Alternative 2 airfoil and linkage design front view.

Figure 10:
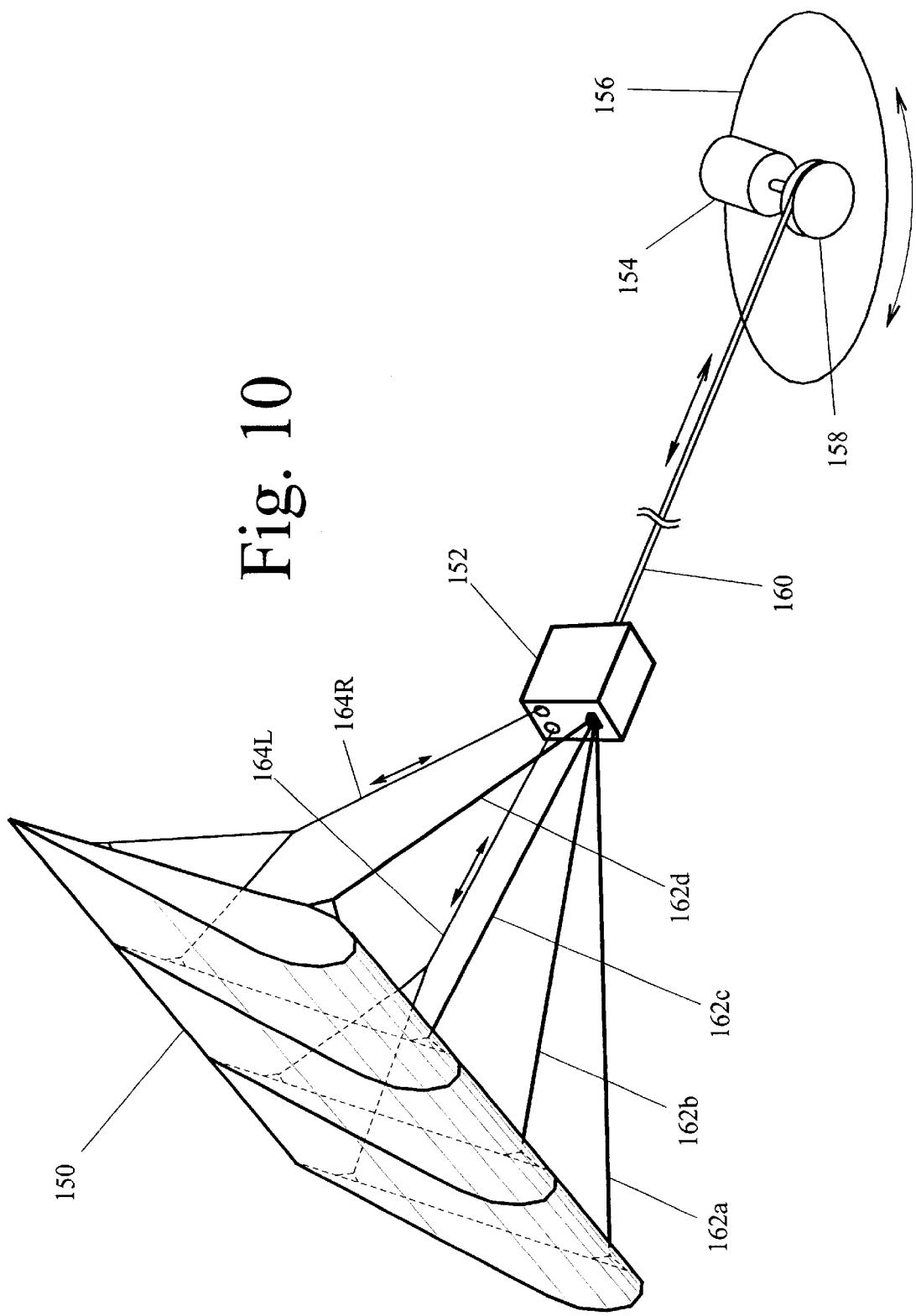

FIG. 10 Alternative 3 airfoil and linkage design perspective view.

Figure 11:
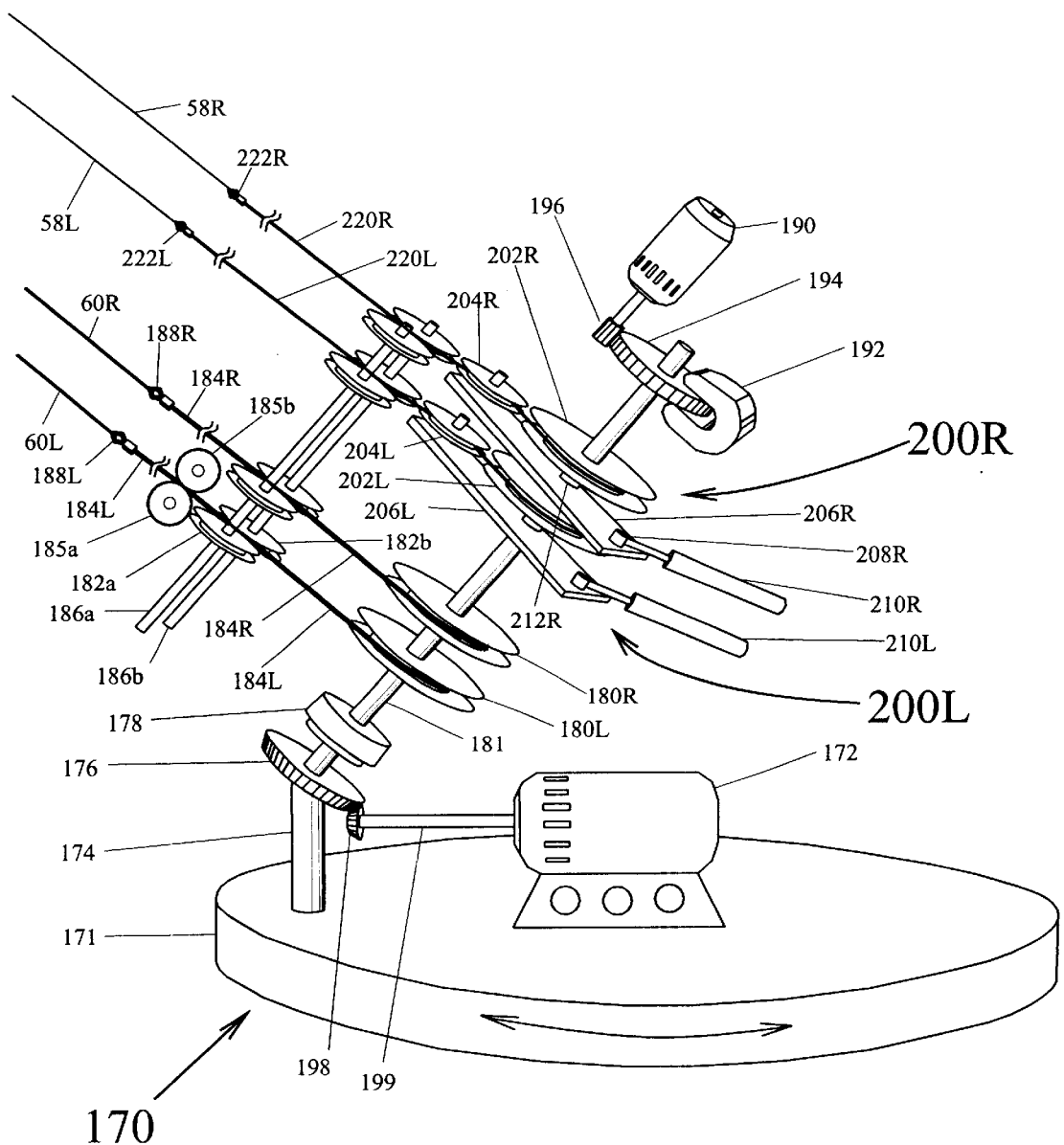

FIG. 11 Preferred control line pulley linkage design perspective view.

Figure 12:
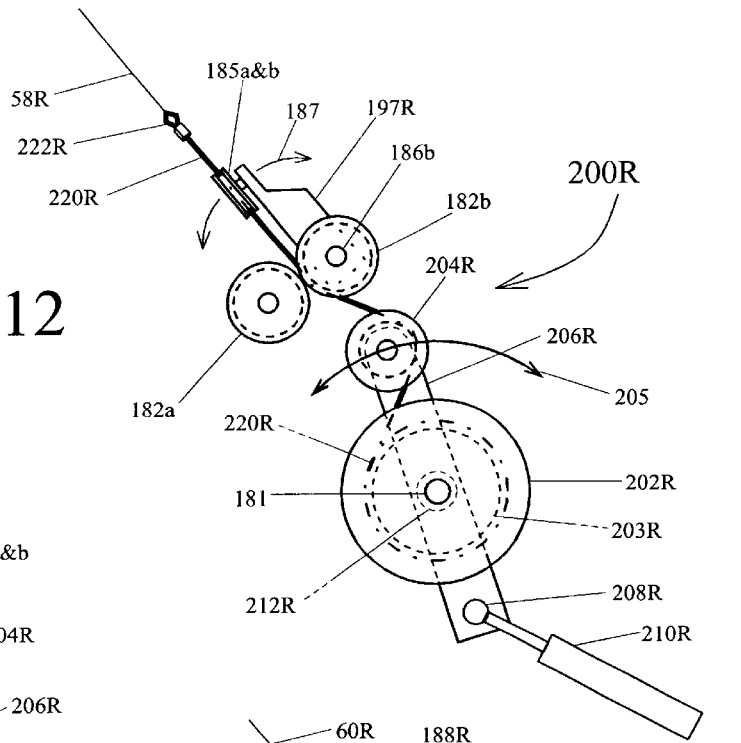

FIG. 12 Preferred control line pulley linkage design top view.

Figure 13:
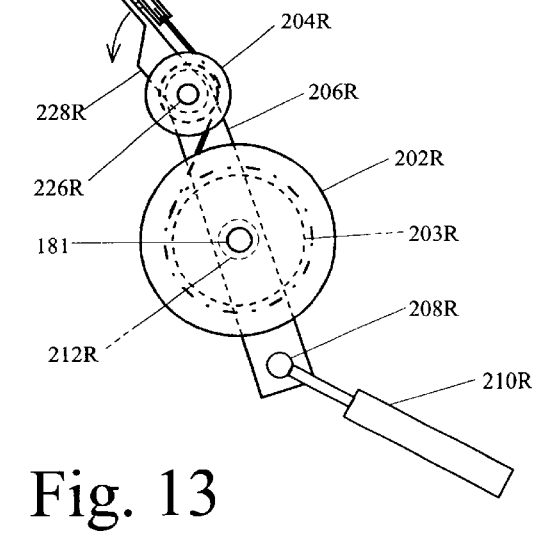

FIG. 13 Alternative control line pulley linkage design side view.

Figure 14:
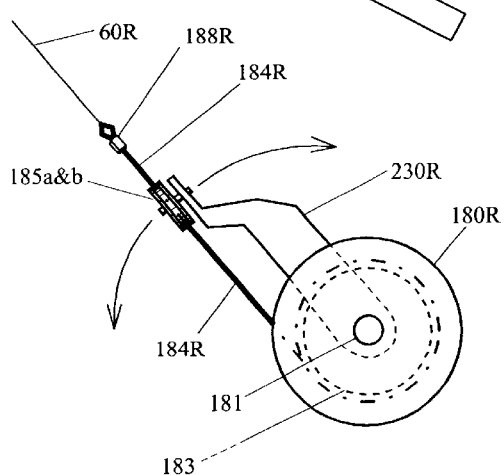

FIG. 14 Alternative pulley linkage design side view.

Figure 15:
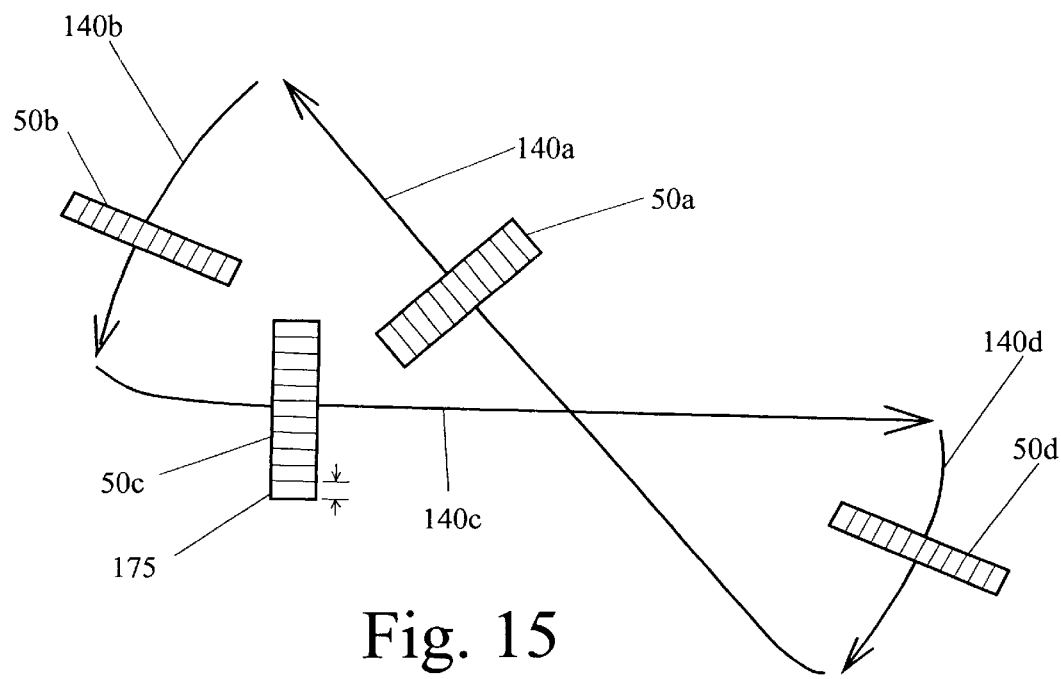

FIG. 15 Airfoil flight path diagram as viewed from ground station.

Figure 16:
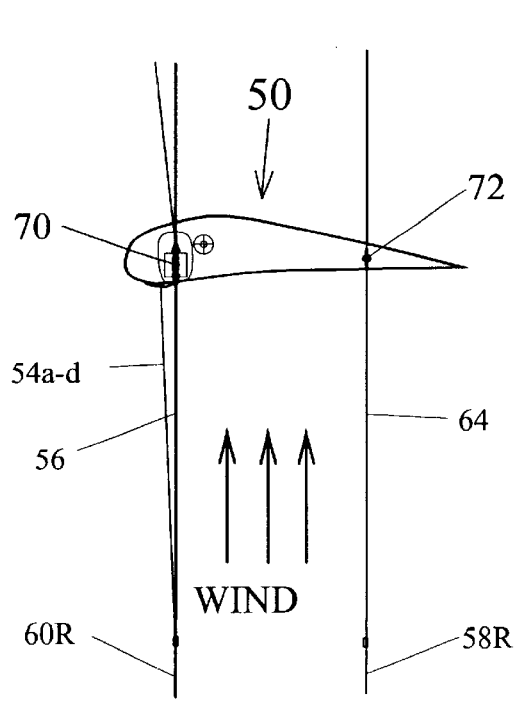

FIG. 16 Airfoil angled for Power Stroke with high LIFT-to-DRAG ratio.

Figure 17:
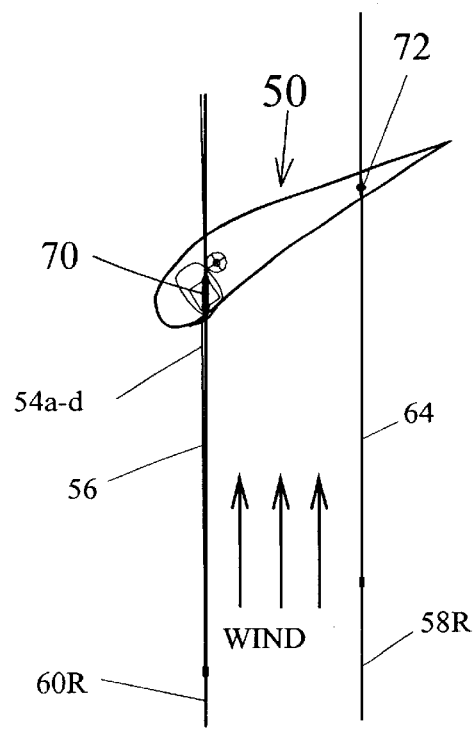

FIG. 17 Airfoil angled for Rewind at negative pitch angle.

FIG. 18 Airfoil force vector diagram.

DETAILED DESCRIPTION OF THE PREFERRED EMBODIMENTS

In FIGS. 2 through 5 we see the presently preferred embodiment of the airfoils that power the disclosed invention. Where multiple airfoils 50 are chained together in tandem to provide more power than a single airfoil. This allows a more modular approach, where failure of a single airfoil does not completely stop power production.

In FIG. 2 we see a complete Linear Wind-Turbine system. The system comprises three airfoils 50 connected together in tandem and connected by support rods 56 and 64. Support lines 54*a*–*d* provide additional support for the airfoil. The three tandem airfoils 50 are connected to a ground station 30 by support lines 60L and 60R in the front and control lines 58L and 58R in the rear. The support and control lines connect to pulleys within swiveling control housing 32 which is mounted on support building 34. Control housing 32 rotates about a vertical axis to allow it to track airfoils 50 as they follow their flight path 140.

In FIG. 3 only the left-side components have been marked because the right-side components are the mirror image of the left-side, the added numbers would have reduced the clarity of the picture. The connecting lines 60L, 60R, 58L, and 58R come from the ground station and use clips 61L, 61R, 59L, and 59R respectfully to connect to the rest of the assembly. Each airfoil section consists of a pressurized airfoil 50, a pair of front attachment pivots 70, a pair of rear attachment pivots 72, a pair of front support rods/connectors 56, a pair of rear support rods/connectors 64, and two sets of support lines 54*a*, 54*b*, 54*c*, and 54*d*.

Airfoil 50 is filled with a lighter-than-air gas to provide positive buoyancy. The airfoil is also pressurized and designed to withstand pressures changes that occur during normal operation, because of changes in elevation or atmospheric conditions. The airfoil has a leading edge 52 which faces in the direction of flight, and a trailing edge 53 which is opposite the leading edge. The front attachment pivots 70 are secured to the front sides of the airfoil on a bearing mount 84, which is attached to a support plate 88, which is attached to a strengthened section 86 of the airfoil (see FIG.

4). The support plate 88 and section 86 are used to provide durability to the attachment pivot 70, since it will be experiencing strong forces. The distance that pivots 70 and 72 protrude from the sides of airfoil 50 is exaggerated to provide drawing clarity. Pivot 70 has a connecting bar 82 which can rotate on its axis. At each end of bar 82 are attachment loops for allowing the connection of clip 62 on the top and clip 57 on the bottom. In this way force is transmitted up the chain of airfoils while at the same time allowing the airfoils to pivot to change their pitch angle (angle between chord line and a plane perpendicular to the control line axis) of airfoil 50. Pivot 72 is smaller than pivot 70 because of the smaller forces, but has a similar arrangement to Pivot 70 with clip 68 connecting on the bottom and clip 66 connecting on the top. Pivot 72 also has a bearing mount 78 and uses a stiffening rod 80 that passes through the airfoil to help keep the rear portion of the airfoil from bowing.

The pair of connectors 56 with end clips 62 and 57 are used to attach the front pivots to connecting line 60L and 60R. Connector 56 is also used to connect one airfoil to the next. All the connectors have the same specific length to determine the distance between airfoils in the chain. Connector 56 must resist stretching and also not distort during use, because any distortion in lower connectors 56 will effect the positioning of the airfoils above it. This is also true for connectors 64 with end clips 66 and 68 in the rear of the airfoil. These front and rear connectors would preferably be semi-rigid rods to only allow limited twisting and movement of one airfoil with respect to the other. With the airfoil chain semi-rigid they will be much less likely to be tangled. However, connectors 56 and 64 can be simply flexible cables and still work effectively.

In FIGS. 3 and 4 the width of the airfoil is narrower than would normally be used, but is drawn this way to fit on the page. If the airfoil is made wider the pressure within the airfoils will not be sufficient to keep it from buckling. To help support the center portion of airfoil support lines 54a through 54d are added to the airfoil to support it across its width. By doing this airfoil 50 can be made quite wide with a connection tab like tab 57 at a periodic spacing. The wider the airfoil gets the more connection tabs 57 there are to support its lift. Thus, by widening the airfoil in this way, the tension per support line stays the same independent of the width of the airfoil. The same thing can be done for the rear portion of the airfoil if necessary and eliminate rod 80 (see FIGS. 6 to 9 for an example of this). This means the system can scale very easily. Also note that by putting the airfoils in tandem as shown in FIG. 3, stress is only increases on connectors 56 and 64, pivots 70 and 72 respectfully, and the control lines 60L, 60R, 58L, and 58R. Thus, the only strength concerns one needs to worry about when adding more airfoils, is to determine if the cables can withstand the forces, and if the ground station can withstand and use those forces.

In FIG. 5 we see a right side view of airfoil 50. The center of aerodynamic force 90 is shown close to where it would be found on a normal airfoil. Notice that pivot 70 is attached close to this center of force and in front of it. To keep tension on both the front and back connectors 56 and 64, pivot 70 cannot be too close to the center of force less the airfoil loose control and roll (Note that this is much less likely to happen if semi-rigid connectors are used on tandem airfoils. Because pivot 70 is near the center of force 90 it carries most of the aerodynamic force generated by the airfoil. Pivots 72 provide the angle-of-attack and pitch angle control for the airfoil, and because it is placed much further away from the center of force 90 it experiences much less force than the front connectors. This allows easier control over the airfoil without having to deal with the full force generated by the airfoils. Also notice that support tabs 55 are placed slightly in front of pivot 70. This is to allow the airfoil to freely rotate its rear section upward to reduce lift for the rewind phase of its flight. This distance is exaggerated for clarity, but can be nearly directly below pivot 70, since airfoil 50 can easily flex to accommodate the airfoil's rotation. Also in FIG. 5 we have added a lightning rod 92. There are many places where such a rod could be placed. If connectors 56 and 64 are made of a conductive metal then they themselves would act as lighting rods. If connectors 56 and 64 are non-conductive then it may be better to just keep the entire system non-conductive to avoid lightning strikes. Another good place to put lightning rods would be out the front and rear of the airfoils to protect them while at the same time generating very little air drag.

In FIGS. 6 and 7 we see an alternative design for the airfoil linkage. In this design airfoil 100 has one tether line pivot 60 at the front of the airfoil and two control line pivots 72 on each side at the rear. On the underside of the airfoil are mounted support line tabs 108a through 108d in the front, and support line tabs 116a through 116d in the rear. These support tabs provide a secure attachment point for support lines 106a through 106d in the front, and support lines 114a through 114d in the rear. Connecting rod 104 is attached to pivot 120 at the top and has a support clip 110 mounted on the other end at the bottom. Support lines 106a–d attach at the bottom to support clip 110 which is attached to clip 61 on the end of line 60 coming from the ground station. Connecting rods 64 have clips 66 and 68 mounted on them and attach to pivot 72 at the top and control lines 58L and 58R at the bottom. Support lines 114a–d attach at the bottom to support clip 66 on each side. Clips 66 attaches to clips 59 on the end of the control lines 58L and 58R coming from the ground station. This effectively attaches the airfoil to the ground through lines 58L, 58R, and 60.

With all the lines attached as shown in FIG. 7, most of the LIFT generated by the airfoil is supported by the support lines 106a–d on each side of the airfoil, and to a lesser extent support lines 114a–d. Airfoils attached above airfoil 100, are attached to pivots 72 and pivot 120 on the airfoil below it. Clips 66 and clip 110 provide attachment of the upper airfoil to pivots 72 and pivot 120 respectfully on the lower airfoil. Thus, the system is modular, with each set of airfoil, support lines, and connecting rods forming a unit that attaches to the airfoil unit below it. The internal pressure in airfoil 100 allows it hold its shape even under the side-to-side compressive forces generated by support lines 114a–d. Note that lines 106a–d produce no compressive forces if airfoil 110 curves :with vertex at clip 110 (support lines 106a–d run perpendicular to LIFT for its section of the airfoil).

In FIGS. 8 and 9 we see another alternative design for the airfoil linkage. In this design two identical airfoils 130 are attached at section 138. More airfoils can be connected like the two shown to make the airfoil arrangement even wider. Each airfoil 130 has a single pivot 120 at the front and a single pivot 140 at the rear. Slots 122 and 142 are placed in the front and rear of the airfoil and support pivots 120 and 140 respectfully. With slots 122 and 142 the pivot supports can be placed at the proper distance from the center of LIFT to provide proper control and support structure. The front portion:of the airfoil is identical to the airfoil in FIGS. 6 and 7, with the support lines correcting to tabs 108a through 108d on each side and connecting rod 104 in the front. The rear section of airfoil 130 is connected similar to the front with a single connecting rod 134 and support lines connecting to support tabs 116a through 116c on each side. With two airfoils 130 connected as shown in FIG. 9, each airfoil can be controlled independently to change its pitch angle and angle-of-attack and allow different LIFT-to-DRAG ratio of each airfoil. Thus, the two attached airfoils can be controlled by differentially adjusting control lines 132 to change the DRAG each airfoil is experiencing. Only two airfoils are needed to provide this control, but additional airfoils may be placed between the ones shown to provide an even wider airfoil. This configuration can also be expanded by chaining more airfoils in tandem.

In FIG. 10 we see a third alternative configuration where a single tether line 160 is used to transmit power to a pulley 158 which is connected to a generator 154. Generator 154 which sits on rotatable platform 156 which turns to tracks the airfoil's flight, keeping pulley 158 lined up with tether 160 so tether 160 feeds smoothly on and off pulley 158. Control box 152 links support lines 162a–d to tether line 160, and also provides mechanical control of lines 164L and 164R to change the angle-of-attack and pitch angle of the airfoil. A pair of simple electric motor and gear mechanisms in box 152 are used to independently reel in and out lines 164L and 164R to adjust the LIFT and flight path of airfoil 150. Tether 160 has three conductors within it (one ground, and one power line for each electric gear box), so that electric power can be transmitted up to control box 152 to power the internal motors for controlling the airfoil control lines 164L and 164R. This design increases the weight of the airborne portion of the system, but it also reduces the line drag by only having a single tether line. Power production would be the same as the other designs shown here, with power generated by powerfully extending tether 160 under the AXIAL component of the lift on the airfoil during its high-speed, high LIFT-to-DRAG ratio power stroke. After the power stroke is complete the pitch angle of the airfoil would be made negative by box 152, which in turn would change the angle-of-attack of the airfoil and allow rewind the tether at much lower tension. Control box 152 can just as easily be radio controlled with only two conductors needed within tether 160 to power the motors. Since much more power is produced when extending tether line 160 than is used when rewinding it, net power is produced.

In FIG. 11 we see the preferred pulley system 170 for the Linear Wind-Turbine in perspective view. The entire pulley system is on a rotatable platform 171, which is also mounted a generator 172 that can generate electrical power for a standard 60 Hz utility grid. The standard electric power conditioning equipment (not shown, prior art) matches the generator's output to the grid voltage and phase. Generator 172 can be almost any design as long as it matches the power conditioning equipment. If generator 172 is a synchronous design, then control measures must be taken to control the rate at which lines 58L, 58R, 60L, and 60R are reeled-out. Wind energy is most efficiently collected if the reel-out rate can be varied, so generator 172 would preferably be an asynchronous design to allow the reel-out speed to change without adversely effecting the electrical power output phase. Gears 176 and 198 provide an step-up transmission (optional, depends on generator) that transfers power to generator 172 through shaft 199. A one-way clutch 178 transfers rotational power to gear 176 only in one direction. This allows shaft 181 to rotate in both directions, but only transmit power to the generator in one direction.

On shaft 181 is mounted four pulleys 180L, 180R, 202L, and 202R. Each of these pulleys are securely and immovably fixed to shaft 181. Should any one of the pulleys come loose from shaft 181, the airfoil kite at the end of lines 58L, 58R, 60L, and 60R would loose control and crash. However, even with loss of control it is unlikely the airfoils would be damaged since they would simply float to the ground (high-power levels are lost when control is lost). In the case of buoyant airfoils they would simply float in the air and probably twist the control lines as they twisted in the wind. At the top end of shaft 181 is another gear 194 and an electric motor 190 to provide rewind force to the pulleys to reel-in the airfoils after a power stroke. Gear 194 also has a brake 192 built onto it to provide emergency stops and also to quickly stop the rotation of the pulley when the power stroke is done and allow more quickly to start rewinding the lines. The moment of inertia of shaft 181 and all the pulleys and gears attached to it is kept as small as possible so that it can be started and stopped with the minimum of energy. Shaft 181 is shown supported by pedestal 174 which secures the shaft to platform 171 and allows it to rotate along its axis. Pedestal 174 is only representative of the support structure for shaft 181. With the powerful forces exerted on it, shaft 181 will actually require several mounting bearings to hold it in place. Such bearings are not shown in FIG. 11 since adding them to the drawing between each pulley would have made the drawing very difficult to read. Note, for low power systems such a pedestal 174 mount would work.

Two control line mechanisms 200L and 200R are used to adjust the airfoil's control lines while reeling them in and out. Tether lines 220L and 220R are attached directly to pulleys 202L and 202R respectfully. Control mechanism 200R is identical with mechanism 200L with similar part number having an "R" or "L" after the number to signify which mechanism it belongs. Because of the identical nature of mechanisms 200L and 200R, we will only discuss mechanism 200R in detail, realizing that 200L has identical structure.

In FIG. 12, we see a top view of pulley mechanism 200R comprising; pulley 202R, pulley 204R, pulleys 182a&b, pulleys 185a&b, control arm 206R, control arm 197R, bracket 208R, piston 210R, and bearing 212R. Tether line 220R connects to control line 58R at connector 222R and threads through pulleys 185a and 185b. Pulleys 185a and 185b are mounted on arm 197R which pivots about the shaft 186b to allow movement 187 shown. This allows changing orientations of line 58R to be compensated for. After tether 220R is passes between pulleys 185a and 185b it passes between pulleys 182a and 182b to eliminate any horizontal force component on the tether line. Then tether 220R passes around adjustment pulley 204R and then onto pulley 202R. Control arm 206R pivots about bearing 212R which is mounted on shaft 181. Piston 210R attaches to arm 206R at pivotable bracket 208R to provide rotational control of arm 206R. On the other end of control arm 206R is pulley 204R which interacts with tether line 220R to change the path length of tether 220R depending on where pulley 204R is positioned by piston 210R. Shafts 186a and 186b are securely attached to platform 171 and has four sets of pulleys 182a and 182b on them. Because of limited room on the drawing each pulley is not labeled in FIG. 11, but each of the tethers 184L, 184R, 220L, and 220R have a pair of pulleys 182a and 182b, one on shaft 186a and the other on shaft 186b respectfully. Pulleys 182a and 182b support tether 220R as control line 58R angles left or right and keeps the tether from binding.

Each tether line also has a second pair of pulleys 185a and 185b guiding it. These pulleys allow tether 220R to angle up or down without binding as control line 58R follows the airfoil path. Pulleys 185a and 185b pivot around shaft 186b (see FIG. 12) to track the movement of control line 58R and guide the tether into pulleys 182a and 182b even when the tether line is off-angle. Note that pivoting the pulleys 185a and 185b about shaft 186b does not provide perfect alignment for the pulleys, but provides very good alignment for small angles deviating from the position shown in FIG. 12. The pivoting of pulleys 185a and 185b will always be small since the platform 171 will rotate to match the direction of the pull on the tether lines. If the platform is electronically controlled then only minor misalignment will ever exist, and pulleys 185a and 185b may be unnecessary.

Tether straps 184L, 184R; 220L and 220R are much stronger than control lines 58L, 58R, 60L and 60R to which they are attached. These tether straps are stronger because they must resist the wear from repeated reeling in and out through the pulleys. The reeling in and out of these tethers is limited to make sure connectors 188L, 188R, 222L and 222R never are pulled through the pulleys during a power stroke. The control lines 58L, 58R, 60L and 60R and their connectors 222L, 222R, 188L, and 188R may be wound onto pulleys 180L, 180R, 202L, and 202R respectfully at low tension to bring the airfoils down for service or replacement. The tether straps would preferably be all the same thickness so that the diameter of the pulley they are winding on changes at the same time for all the pulleys 180L, 180R, 202L, and 202R. The flat tether straps also allow for easy stacking of the tether on the pulley as the layers build up. The tethers can also be wound beside each other as a single layer so the pulley diameter effectively stays the same. This however, would require much wider pulleys than are shown in FIG. 12 and would also require a winding mechanism to smoothly wind the tethers across the pulleys. Instead, flat tethers are wound on top of each other and allow a much narrower pulley to be used and no winding mechanism is needed. However, if all the tether straps are not the same thickness they will not wind onto the pulleys at the same rate and the extended length of the tether will change depending on the amount of tether wound on the pulley. It is preferable that the relative position of connectors 188L, 188R, 222L and 222R is not a function of the amount of tether strap on the main pulleys. This makes it easer for mechanisms 200L and 200R to control the airfoils. Since, tether straps 184L and 184R will have a much greater tension on them than tethers 220L and 220R, tethers 184L and 184R can be made wider than 220L and 220R to provide the extra strength and still keep the same thickness. Preferably tether straps 184L, 184R, 220L, and 220R would be a thin spring-steel band, with straps 184L and 184R being wider than 220L and 220R, but all four having the same thickness.

The control lines 58L, 58R, 60L and 60R have very little wear since during normal operation they never touch anything except air. They are also designed to operate at a significant percentage of their breaking strength since the lighter these lines are, the less air resistance, and also the less sag in the line as it goes to the airfoils. Both the air resistance and sagging of the line reduces power production. Air resistance reduces the effective LIFT-to-DRAG ratio for the airfoil, which reduces power, and the sagging of the lines increases the angle at which the airfoils operate with respect to the wind, which causes the wind to strike the airfoil at a more glancing angle, increasing the cosine cubed losses. This sag is relatively small while control line lengths are less than 500 feet, but can get substantial as line length becomes thousands of feet long. Thus, for very high altitude operation the lighter the control lines the better.

FIG. 12 shows the top view of the preferred pulley control system 200R in FIG. 11. The pulley mechanisms for pulleys 180L and 180R are also identical to that shown in FIG. 12, but without pulley 204R, arm 206R, bearing 212R, pivot mount 208R, and piston 210R. If differential control of the front section of the airfoils is desired, then pulleys 180L and 180R could include the full mechanism shown in FIG. 12. The tether winds up one layer at a time on spool surface 203R as pulley 202R rewinds the tether. Since the tether is only rewound under low tension, spool 203R does not have to be as strong as it would need to be if rewound under full tension during a power stroke, since the combined force of the windings could crush the spool. Control arm 206R supports pulley 204R and moves pulley 204R by rotating arm 206R about bearings 212R on shaft 181. By exerting force on attachment 208, piston 210 controls the position of pulley 204R which effectively changes the path length of tether 220R as it threads through the pulleys. The axis of pulley 204R follows the path marked 205, and when pulley 204R is aligned with pulley 182a then tether 220R goes straight from pulley 202R and out through pulleys 182a and 182b. If piston 210R is filly extended, pulley 204R is moved around to the right of pulley 202R (as shown by arrow 205) and the tether must now take a path over to pulley 204R and then back between pulleys 182a and 182b. The effect of this is the tether takes a longer path and connector 222R is pulled closer to the pulley system than connector 222L. With the same control mechanism in 200L controlling tether 220L, each side of the airfoil can be adjusted to its own angle-of-attack by shortening or lengthening tethers 220L and 220R. Piston 210R can be electric or hydraulic in nature, but must be extremely reliable since a failure of one piston can cause the airfoils to loose control. A redundant piston system would probably be a good addition to the control mechanism.

FIGS. 13 and 14 shows an alternative way of constructing a pulley mechanism. In FIG. 13, pulley 202R, control arm 206R, piston 210R, pulley 204R, pulley 185a and pulley 185b are all essentially the same as in FIG. 12 accept for this design, normal operation is with the rotational axis horizontal. That is to say, shafts 181 and 226R are parallel to the ground during use. Pulley 204R controls any vertical movement in line 58R, and also provides length control for tether 220R. Pulleys 185a and 185b keep tether 220R aligned with pulley 204R when line 58R moves horizontally. Arm 228R pivots around the same axis as pulley 204R with pulleys 185a and 185b offset to align with the spool surface of pulley 204R. This arrangement gives better tracking of tether line 220R than the design in FIG. 12 and also uses less pulleys.

FIG. 14 shows an alterative design for the non-control tethers version of the pulley system seen in FIG. 13 with shaft 181 horizontal. In this design the length of tether 184R does not need adjusting. Horizontal movements of line 60R are constrained by pulleys 185a and 185b on arm 230R, which transmit a restoring force down arm 230R to rotate the entire assembly about a vertical axis. Arm 230R and pulleys 185a&b stay aligned with tether strap 184R as pulleys 185a&b tracking any vertical changes in tether 184R as it is wound onto spool surface 183. Tether 184R may be wound directly onto pulley 180R with very little force exerted on pulleys 185a&b or arm 230R.

Operational Description—FIGS. 2, 11, 12, and 15 through 18

FIG. 2 shows a typical linear airfoil arrangement. Three tandem airfoils 50 attached to control lines 60L, 60R, 58L and 58R coming from a ground station 30. The airfoils 50 are flown downwind from the ground station 30, with the airfoil's flight direction approximately perpendicular to the wind direction as they follow flight path 140. The ground station uses the pulley and control system 170 shown in FIGS. 11 and 12 to control the airfoils. The pulley system 170 in FIG. 11 is placed within the swiveling control housing 32 (see FIG. 2) to protect the equipment from the environment. Ground station 30, also has a support building 34 to store other equipment and also to raise the elevation of the control lines above the ground to protect people from the moving lines. As one can see in FIG. 2 the airfoils follow a somewhat tilted figure "8" pattern in the sky while it goes through alternating power stroke, and rewind phases of its flight path. The control lines provide five major functions: 1) tethers the airfoils for flight, 2) provides pitch angle control of the airfoils, 3) provides control of the airfoil's flight path, 4) collects power in the AXIAL direction for useful work, and 5) transmits power down to the ground station for utilization.

FIG. 15 shows a typical flight path of the airfoil kites viewing them from the ground station. Airfoil 50 is shown in four positions: 50a, 50b, 50c, and 50d. In position 50a the airfoil is in its power stroke and moving at high speed along power stroke path 140a. At the end of the power stroke the airfoil's orientation is pointed into the wind and the airfoil is rewound back toward the ground station. In position 50b the airfoil is being rewound along rewind path 140b. After the airfoil is rewound it restores its pitch angle for a high LIFT-to-DRAG ratio to produce another power stroke. At position 50c, the airfoil is being reeled-out to produce power along power stroke path 140c. After this power stroke the airfoil is again orientated into the wind to reduce LIFT, and the airfoil is rewound back in. In position 50d the airfoil is turning to get in position for the next power stroke (path 140a) as it rewinds. After the airfoil has been rewound alone path 140d the airfoil is ready to repeat the loop again (140a through 140d).

Over the next few paragraphs we will be discussing in more detail the operation of the linear airfoil's four distinct phases which correspond to the four flight path (140a–d) seen in FIG. 15. As each phase will be discussed and we will refer back to FIGS. 11 and 12 when discussing the operation of the pulley system as it controls the airfoils.

The airfoils start their flight path with power stroke 140a, which in FIG. 15 goes from the lower-right to upper-left. The actual flight path need not follow the exact path shown, but can turn back and forth many times to remain downwind of the ground station as the tether lines are reeled-out. During this power stroke, the airfoil is angled nearly perpendicular to its control lines (pitch angle=0), as shown in FIG. 16, to produce high-speed flight at airfoil position 50a and tremendous tension on the control lines. Pulley control line mechanisms 200L and 200R (see FIGS. 11 and 12) are used to continually adjust the length of control lines 58L and 58R respectfully, and provide the proper flight direction and LIFT on the airfoil throughout the power stroke. During power stroke phase 140a all four lines 58L, 58R, 60L and 60R are under high tension and are being reeled-out from the pulleys on shaft 181. This forceful reeling-out of the lines turns shaft 181 in the direction which locks one-way clutch 178 to gear 176, and thus turns generator 172 through gear 198 and shaft 199. Control line mechanisms 200L and 200R are adjusted during flight to keep the airfoil near maximum power. This is done with control pulleys 204L and 204R which are positionally adjusted by actuators 210L and 210R to change the path length of control lines 58L and 58R respectfully during the entire operational cycle of the airfoil. Fine adjustments of these actuators is used to maximize power output as conditions change during the power stroke phases 140a. Actuators 210L and 210R are hydraulic pistons in this design, but electric drive actuators would work just as well, and may require less maintenance.

The actual operational control over actuators 210L and 210R would require a feedback system to determine the position and direction of flight of the airfoil, and then make changes in the actuators position to adjust the flight characteristics of the airfoil. A computer control would be used to determine what changes in the actuators positions would be needed and then direct actuators 210L and 210R to change the pitch angle and direction of flight of the airfoil to accomplish these changes. Such control and feedback systems are very well understood and pose only minor problems in making the system reliable. Of course one can also use the best feedback system, a human operator, to control the airfoil's flight. While a human operator may not be cost effective, they represent an already available feedback control system.

As the airfoils move right-to-left across the sky (power stroke 140a), the pulley system 170 must rotate about the vertical axis of the control housing 32. Such a horizontal change in direction causes arm 197R & 197L to pivot pulleys 185a and 185b to compensate for the misalignment (see FIG. 11). However, as soon as the control lines become slightly off axis, the tension in the lines cause a torque to be placed on pulleys 182a and 182b, which causes platform 171 to turn in the direction of the airfoils. In this way, the entire system 170 always faces in the direction of the airfoil kites. Note that the pulleys are positioned to one side of platform 171, this is to allow any off axis alignment of the tethers to produce a restoring torque on platform 171. The relative position and flight path during this power stroke phase are seen at position 50a and path 140a in FIG. 15.

As tethers 184L, 184R, 220L, and 220R near the end of their reel-out phase (power stroke), mechanisms 200L and 200R move control arms 206L and 206R respectfully to lengthen their respective tethers 220L and 220R. This changes the angle-of-attack and pitch angle on the airfoils, with the rear portions of the airfoils moving upward, as seen in FIG. 17. This allows a low-DRAG, low-LIFT, rewinding of all the tether lines back onto pulleys 180L, 180R, 202L, and 202R. As the airfoils are rewound they follow a slightly downward path as shown by rewind path 140b. At nearly the same time as control mechanisms 200L and 200R changes the angle of the airfoils, brake 192 engages gear 194 and quickly stops shaft 181 from rotating. This effectively stops the momentum of the pulleys, so electric motor 190 can engage gear 194 and begins rewinding the tethers onto their pulley. As they rewind the tethers, the airfoils turn in flight to get ready for the next power stroke. In FIG. 11 one can see the extending of the tethers is accomplished by piston 210L and 210R forcing arm 206L and 206R to move counterclockwise to move pulley 204L and 204R nearer their respective pulleys 182a and 182b. The relative position and flight path during this rewind phase are seen at position 50b and path 140b in FIG. 15. One-way clutch 178 disengaged from shaft 181 to allow gear 176 to continue to rotate with generator 172. If more than one kite train were being used, then at the same time the first kite train stopped producing power, the second kite train would begin its power stroke and thus provide continuous power to generator 172 to provide nearly constant electrical power output. However, FIG. 11 only shows a single kite train controller so for this system the generator simply stops producing power at the end of a power stroke.

After motor 190 has rewound tethers 184L, 184R, 220L, and 220R fully, the motor disengages, and control mechanisms 200L and 200R rotate arms 206L and 206R respectfully clockwise to retract control tethers 220L and 220R with respect to the length of tether lines 184L and 184R. As this is done the LIFT on the airfoils quickly begins to build and the airfoils accelerate forward. Control mechanisms 200L and 200R adjust the control tethers to provide maximum power. The tension on the lines begin to turn shaft 181 and engages clutch 178 to drive the generator. The airfoils are now going from left to right in power stroke path 140c and position 50c in FIG. 15. Again tethers 184L, 184R, 220L, and 220R are reeled-out to produce power, and at the end of the power stroke the control mechanisms 220L and 220R change the pitch angle of the airfoils to reduce lift and prepare for the rewind phase. The brake stops the pulley system and motor 190 rewinds the tether lines onto their pulleys. The relative position and flight path during this second rewind phase is seen at position 50d and rewind path 140d in FIG. 15. This finishes the sideways figure "8" path 140 of the airfoils and the process repeats over and over again to continue to produce pulsed power from the generator. If two or more linear wind-turbines are linked electrically together, their output can be controlled to provide relatively steady power. Similarly, if two or more airfoil trains are physically linked to a single generator, timing of the power strokes can provide relatively steady power output also.

The flight path shown in FIG. 15 is designed to prevent the control lines from contacting one another. The control lines are untwisted when the airfoil's leading edge is pointing toward the ground as shown at positions 50b and 50d. The airfoil's zero-angle is at this orientation so the front and rear control lines on the airfoil match the pulley arrangement as seen in pulley system 170 in FIG. 11. Notice that this path only rotates the airfoil 120 degrees to either side of the zero-angle for the airfoil. Because the full rotation of the airfoils is less than 180 degrees to either side of the zero-angle, the control lines will not touch one another even when the airfoil is fully rotated as it is during a power stroke. The rewind phase just as easily happen with the airfoils travel upward, but the positioning of control pulleys 200L and 200R would need to be placed below pulleys 180L and 180R to prevent the control lines from hitting one another. In general, the rewind force will be less when rewinding is done with the airfoils pointing in the downward direction. However, the loss in altitude may be undesirable in some situations. In these cases, rewinding can occur while the airfoil travels basically sideway and turning for the next power stroke after the rewind is complete.

In FIG. 16 we see airfoil 50 positioned as it would appear during a power stroke. The airfoil is in a wind stream coming from the bottom of the page as shown. At this approximate angle position, airfoil 50 would move at high-speed to the left and operate as a high LIFT-to-DRAG ratio airfoil. The angle-of-attack is optimized by moving control lines 64 up and down with respect to lines 56, thereby adjusting the pitch angle to produce the greatest power for a given combination of wind speed, airfoil speed, and control line reel-out speed.

In FIG. 17 we see the same airfoil 50 positioned as it might appear during the rewind phase. Control lines 64 are extended with respect to lines 56 to tilt (negative pitch angle) the airfoil into the wind. At this orientation the airfoil is literally flying toward the ground station and very little line tension is needed to reel it in quickly because of the low DRAG of the airfoil. The airfoil's angle-of-attack remains positive to keep the airfoil under control during the rewind phase, but is reduced to limit the forces on the airfoil and to reduce air DRAG as the airfoil is reeled-in. In this low angle-of-attack position, pivot 72 is far above pivot 70, and there is very little resistance to rewinding. Notice that pivots 70 and 72 have pivoted so that the forces along rods 64 and 56 are transmitted directly through the pivots to the next airfoil in tandem. If no pivots were used, then rods 56 and 64 would tend to bind the airfoil from changing its orientation. Pivots 70 and 72 can limit further rotation of the airfoil to prevent accidental flipping of the airfoil, and thus loss of control. Also note that support lines 54a–d do not bind when the airfoil pivots, but rotate with the airfoil in such a way that very little stretching of the lines 54a–d or bending of the airfoil is needed to move from the position in FIG. 16 to the position in FIG. 17.

In FIG. 18 we see a force diagram for a 10 square meter airfoil, with a LIFT-to-DRAG ratio of 10 (L/D=10), in an 8 meter per second wind. The same airfoil is shown in Table 1 at a number of wind speeds. Note that in steady state flight, the components of THRUST and DRAG exactly cancel in the direction of flight of the airfoils. The only remaining force is the AXIAL force which is supported by the control and support lines. This AXIAL force can be broken into DRAG and LIFT components as seen in the diagrams in FIGS. 1 and 18. The AXIAL force is actually greater than the LIFT force (force perpendicular to relative wind flow), because a small component of the DRAG force not in the direction of flight adds to the AXIAL force. All the forces have been centered around the aerodynamic "center of moment" in FIG. 18. The high-speed flight of the airfoil produces an AXIAL force that is perpendicular to the direction of travel of the airfoil (not including velocity added by reeling-out of the control lines). If the airfoil is accelerating their will also be a component of THRUST. The DRAG force is in the direction of the relative air flow by definition, and LIFT is perpendicular to the relative air flow by definition. The relative airflow speed and direction is the vector sum of both the wind velocity, and the airfoils velocity (direction and speed). At an airfoil speed 6 times the apparent wind speed (apparent wind speed is equal to the actual wind speed minus line reel-out speed {not taking into account off axis Cos θ factors}), the relative wind direction is 5.7 degrees off from the tangent velocity direction of the airfoil. This causes the LIFT to also be angled 5.7 degrees forward from the AXIAL force. This forward tilt produces a THRUST in the direction of flight. However, because the airfoil is unrestrained by the control lines in the direction of flight, the only net forces present on the airfoil is the AXIAL force, which is transmitted down the control lines as Line Tension force. The DRAG and THRUST forces canceling because the airfoil accelerates until all THRUST is canceled by DRAG. Another way to say it is that at full operating speed, the DRAG on the airfoil will exactly cancel the THRUST so that the airfoil is neither speeding up nor slowing down. Note that without reeling-out the control lines, both the operating speed and LIFT of the airfoil are much greater than when the lines are being reeled-out. Thus, an airfoil can accelerate rapidly if its control lines are not allowed to reeled-out. Releasing the control lines after the airfoil reaches operating speed is one way to get the airfoils to reach full operating speed quickly. Once up to speed, the airfoil's speed is held relatively constant by the control of three factors: 1) the speed of reel-out of control lines, 2) the pitch angle of the airfoil, and 3) the angle θ between the wind velocity and the direction of the control lines at the airfoils.

Ramifications and Scope

Although the above description of the invention contains many specifications, these should not be viewed as limiting the scope of the invention. Instead, the above description should be considered illustrations of some of the presently preferred embodiments of this invention. For example, the airfoil can be made in many different ways including having cells laid along its cord or cells laid along its width, or even no cells at all—just connecting lines or straps inside the airfoil between the upper and lower surface to hold its shape (this has been done in the aerospace industry for planes with inflatable wings). The technology needed to produce these air-tight pressurized airfoils already exists in many forms. For example, the white-water raft market use a very rugged and light-weight fabric that is extremely strong and remains air tight even under extreme stress. The bonding method used by these raft builders can easily be adapted to form airfoil shaped "rafts" for floating in the sky. The airfoil can also use a standard airfoil shape that maximizes the volume to surface area ratio. There are many high LIFT-to-DRAG ratio airfoils on the books that have very thick cross sections. By using one of these "fat" airfoil shapes one can added buoyancy from the added volume without sacrificing a high LIFT-to-DRAG ratio. The pulley system can also be designed in many different ways and sizes. For example, three pulleys are all that would be needed to control an airfoil kite system like that shown in FIGS. 6 and 7. Also more than 4 pulleys can be used for wider airfoil systems such as that shown in FIG. 9 with added airfoils between the two shown. There are also many other kite control schemes which would work which would require slightly different pulley and control mechanism arrangements, but would be easy for someone skilled in mechanical engineering to accomplish. Also, the pulley control system need not feed the lines directly out to the airfoils. Instead, the lines can be sent up to pulleys at the top of a high tower so that the airfoils fly around this elevated point. This allows the airfoils to still fly at high altitude but with a shallower theta ($\theta$) angle with the horizon. By doing this, the Cosine Cubed losses $\{Cos^3(\theta)\}$ can be reduced to nearly zero by flying the control lines nearly parallel to the ground.

Thus, the scope of this invention should not be limited to the above examples but should be determined from the following claims.

I claim:

1. A wind driven apparatus for harnessing wind energy, comprising;
    a) at least one inflatable airfoil kite;
    b) a ground station with at least one pulley adapted to transmit useful power to a shaft for energy utilization;
    c) at least one flexible tether line connecting said inflatable airfoil kite to said pulley for transferring the axial portion of the aerodynamic lift generated by said inflatable airfoil kite to said pulley, whereby useful power is generated while reeling-out said flexible tether line from said pulley under axial tension;
    d) a means for controlling the flight path of said inflatable airfoil kite in a substantially perpendicular direction to said flexible tether line above the ground, and further including a means for operating said airfoil at an air speed greater than two times the ambient wind speed;
    e) a means for rewinding said flexible tether line back onto said pulley after being reeled-out, whereby the wind driven apparatus is ready to reel-out the tether line under axial tension again.

2. The wind driven apparatus in claim 1, further including;
    a means of operation defined by said means for controlling the flight path for directing said inflatable airfoil kite to operate at a flight air speed approximately two-thirds the ambient wind speed multiplied by the lift-to-drag ratio of the combined airfoil and tether line, thereby maximizing the power generated by said wind driven apparatus.

3. The wind driven apparatus in claim 2, wherein;
    said inflatable airfoil kite and tether line having a combined lift-to-drag ratio greater than six, whereby said inflatable airfoil kite may operate at air speeds greater than three times the ambient wind speed.

4. The wind driven apparatus in claim 1, further including;
    a means for reeling-out said flexible tether line from said pulley at an axial speed greater than one-third the ambient wind speed to reduce the apparent wind speed on said inflatable airfoil kite and thereby reduce tension on the tether during strong-wind condition.

5. The wind driven apparatus in claim 1, wherein;
    said at least one inflatable airfoil kite is pressurized with a gas.

6. The wind driven apparatus in claim 5, wherein;
    said gas is a lighter-than-air gas.

7. A wind driven apparatus for harnessing wind energy, comprising;
    a) at least one airfoil kite with a lift-to-drag ratio greater than three, including a leading edge, a trailing edge and two side ends;
    b) a ground station with at least one pulley adapted to transmit useful power to a shaft for energy utilization;
    c) at least one flexible tether connecting said airfoil kite to said pulley and defining a longitudinal axis between said pulley and said airfoil kite;
    d) a control assembly connected to said airfoil kite for independently adjusting the pitch angle of said two side ends while the airfoil is in flight, whereby the airfoil's lift and direction of flight can be controlled;
    e) a flight control means defined within said control assembly for controlling said airfoil kite to trace an oscillating flight path substantially perpendicular to said longitudinal axis at speeds greater than two times the ambient wind speed for generating an axial force on the tether, whereby power is generated by reeling-out said flexible tether off said pulley;
    f) said flight control means further including a means for significantly decreasing lift on said airfoil kite to provide substantially less axial tension on the tether while reeling-in the tether back onto the pulley, whereby alternate reeling-in and reeling-out of the tether produces intermittent power output to said shaft.

8. The wind driven apparatus in claim 7, wherein:
    said control assembly comprises a control box with a top and bottom end, and a plurality of control supports attached between said top end and said airfoil kite;
    said bottom end of the control box connected to said flexible tether and able to transmit force down the tether to said pulley;
    at least one of said control supports having a fixed length and attached near the leading edge of the airfoil and providing support for the airfoil;
    at least two of said control supports independently adjustable in length by said control box and one control support attached in the general area of each of the two ends of the airfoil and near said trailing edge for independently adjusting the pitch angle of the two ends;
    said control box electrically driven from the ground station through conductive wires within said flexible tether; whereby said control box need not carry its own power supply.

9. The wind driven apparatus in claim 7, wherein:

said flexible tether comprising at least three control lines, each control line attached to a separate pulley system;

at least one control line attached directly to the airfoil near the center of force on the airfoil thereby supporting more than fifty percent of the axial force generated by the airfoil;

at least two of said control lines independently adjustable in length with respect to the directly attached control line by said control assembly, and adjusted by the control line's own respective pulley system, with at least one control line attached near each side end of the airfoil, whereby the direction of flight and lift experienced by the airfoil can be controlled by independently adjusting the pitch angle of said two side ends.

10. The wind driven apparatus in claim 7, wherein;

said flight control means further including a means for operating said airfoil kite at a flight air speed approximately two-thirds the ambient wind speed multiplied by the lift-to-drag ratio of the combined airfoil and tether, thereby maximizing the power generated by said wind driven apparatus.

11. The wind driven apparatus in claim 7, further including;

a means for reeling-out said flexible tether off of said pulley at an axial speed greater than one-third the ambient wind speed to reduce the apparent wind speed on the airfoil kite and thereby reduce tension on the tether during strong-wind condition.

12. The wind driven apparatus in claim 7, wherein;

said at least one inflatable airfoil kite is sealed and pressurized with a lighter-than-air gas.

13. A method for harnessing wind energy with a controllable airfoil kite attached by at least one flexible tether to at least one pulley adapted to transmit useful power to a shaft for energy utilization, comprising the steps of:

a) flying said controllable airfoil kite above the ground;

b) adjusting the pitch angle of the airfoil to significantly increase lift on the airfoil for propelling the airfoil kite to fly substantially perpendicular to said flexible tether and for flying said flexible airfoil at speeds greater than two times the ambient wind speed, so as to generate-an axial tension on the tether;

c) reeling-out said flexible tether from said pulley while under force from said axial tension and flying said controllable airfoil kite above the ground and substantially down wind from said pulley, whereby useful power is generated;

d) adjusting the pitch angle of the airfoil to significantly reduce lift by tilting the airfoil to provide a substantially negative pitch angle, whereby the tension on the tether is significantly reduced;

e) rewinding said flexible tether back onto said pulley while the airfoil's axial tension is significantly reduced; and f) repeatedly repeat steps b) through e) to generate a continuous stream of intermittent power strokes bursts from step c).

14. The method in claim 13, including;

timing said step c) so that it alternates with step c) of a second airfoil kite using steps a) through f) to provide: relatively steady power output.

15. The method in claim 13, further including;

providing said controllable airfoil kite with a lift-to-drag ratio of greater than six; and flying said controllable airfoil kite at a flight speed greater than three times the ambient wind speed during said reeling-out said flexible tether.

16. The method in claim 15, further including;

sealing and pressurizing said controllable airfoil kite with a gas.

17. The method in claim 15, further including;

inflating and pressurizing said controllable airfoil kite with a lighter-than-air gas.

18. The method in claim 13, wherein;

said step c) further includes flying said controllable airfoil kite at a flight speed approximately two-thirds the ambient wind speed multiplied by the lift-to-drag ratio of the airfoil and tether combined, whereby output power is substantially maximized.

19. The method in claim 13, wherein;

said step c) further includes controlling the reel-out speed of said flexible tether at an axial speed greater than one-third the ambient wind speed to reduce the apparent wind speed on the airfoil kite and thereby reduce tension on the tether during high-wind condition.

* * * * *